United States Patent
Sauvé et al.

(10) Patent No.: US 9,934,252 B2
(45) Date of Patent: Apr. 3, 2018

(54) METADATA-BASED PHOTO AND/OR VIDEO ANIMATION

(71) Applicant: Microsoft Technology Licensing, LLC, Redmond, WA (US)

(72) Inventors: Aaron Joseph Sauvé, Seattle, WA (US); Jeffery G. Arnold, Sammamish, WA (US); Kathryn C. Lemson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 201 days.

(21) Appl. No.: 14/203,469

(22) Filed: Mar. 10, 2014

(65) Prior Publication Data

US 2015/0254281 A1 Sep. 10, 2015

(51) Int. Cl.
*H04N 5/262* (2006.01)
*H04N 5/225* (2006.01)
(Continued)

(52) U.S. Cl.
CPC ...... *G06F 17/30268* (2013.01); *G06F 3/0482* (2013.01); *G06F 3/04883* (2013.01); *G06T 13/80* (2013.01); *G11B 27/034* (2013.01); *H04N 1/212* (2013.01); *H04N 1/215* (2013.01); *H04N 1/2112* (2013.01); *H04N 5/23216* (2013.01); *H04N 5/23293* (2013.01);
(Continued)

(58) Field of Classification Search
CPC ............. G06F 17/30268; G06F 3/0482; G06F 3/04883; G11B 27/034; H04N 21/8455; H04N 5/23216; H04N 5/23293; H04N 5/2621; H04N 1/2112; H04N 1/212; H04N 1/215; H04N 5/77; H04N 9/8205; H04N 21/25825; H04N 21/25833; G06T 13/80

See application file for complete search history.

(56) References Cited

U.S. PATENT DOCUMENTS 6,937,273 B1 * 8/2005 Loui ................ G11B 27/034
348/220.1
2003/0189647 A1 * 10/2003 Kang ................ H04N 5/232
348/207.99

(Continued)

FOREIGN PATENT DOCUMENTS

EP 1089562 A1 4/2001
EP 1713263 A2 10/2006
EP 2007144 A1 12/2008

OTHER PUBLICATIONS

"International Search Report and Written Opinion Issued in PCT Patent Application No. PCT/US2015/017885", dated Jul. 2, 2015, 20 Pages.

(Continued)

*Primary Examiner* — Twyler Haskins
*Assistant Examiner* — Carramah J Quiett
(74) *Attorney, Agent, or Firm* — Wade IP Law LLC

(57) ABSTRACT

Techniques are described herein that are capable of providing metadata-based photo and/or video animation. For instance, multiple images (e.g., still images) of a scene may be combined into an image sequence. An image may be selected from the multiple images to represent the scene. Such an image may be referred to as a primary image. Metadata may be associated with the primary image. The metadata may include a reference to the image sequence.

20 Claims, 12 Drawing Sheets

(51) Int. Cl.
| | |
|---|---|
| *G06F 17/30* | (2006.01) |
| *G06T 13/80* | (2011.01) |
| *H04N 5/232* | (2006.01) |
| *G06F 3/0482* | (2013.01) |
| *G06F 3/0488* | (2013.01) |
| *G11B 27/034* | (2006.01) |
| *H04N 1/21* | (2006.01) |
| *H04N 5/77* | (2006.01) |
| *H04N 9/82* | (2006.01) |
| *H04N 21/414* | (2011.01) |
| *H04N 21/4223* | (2011.01) |
| *H04N 21/81* | (2011.01) |
| *H04N 21/854* | (2011.01) |

(52) U.S. Cl.
CPC ............. *H04N 5/2621* (2013.01); *H04N 5/77* (2013.01); *H04N 9/8205* (2013.01); *H04N 21/41407* (2013.01); *H04N 21/4223* (2013.01); *H04N 21/8153* (2013.01); *H04N 21/854* (2013.01)

(56) References Cited

U.S. PATENT DOCUMENTS

| | | |
|---|---|---|
| 2004/0264789 A1 | 12/2004 | Akiyama et al. |
| 2005/0204288 A1 | 9/2005 | Clapper |
| 2006/0064716 A1* | 3/2006 | Sull .................. G06F 17/30793 725/37 |
| 2006/0282386 A1* | 12/2006 | Szeto .................... H04L 12/581 705/50 |
| 2007/0139443 A1 | 6/2007 | Marks et al. |
| 2010/0290757 A1* | 11/2010 | Ariyoshi ............. G11B 27/034 386/241 |
| 2013/0069962 A1* | 3/2013 | Nealer ............. H04M 1/72563 345/522 |

OTHER PUBLICATIONS

"Get Animated Wallpapers on Your Lockscreen or Homescreen With 'LivePapers'", Published on Feb. 24, 2013, Available at: http://iphone.pandaapp.com/news/02252013/Get_Animated_Wallpapers_On_Your_Lockscreen_Or_Homescreen_With_LivePapers.shtml#.UaX1NrUczxo, 5 pages.
"Burst Mode Camera", Retrieved on Jun. 3, 2013, Available at: https://play.google.com/store/apps/details?id=com.wombatix.burstcam&hl=en, 2 pages.
"Camera GIF Creator", Retrieved on Jun. 3, 2013, Available at: https://play.google.com/store/apps/details?id=net.atredroid.cameragifcreator&feature=search_result, 2 pages.
"GIF Movie Player Maker", Retrieved on: Jun. 3, 2013, Available at: https://play.google.com/store/apps/details?id=com.GIFMoviePlayerMaker_20514&feature=search_result, 2 pages.
"Funkytone Caller ID Ringtone", Retrieved on: Jun. 3, 2013, Available at: https://play.google.com/store/apps/details?id=com.funkytone&hl=en, 2 pages.
"Cinemagram", Retrieved on: Feb. 17, 2014, Available at: http://cinemagr.am/, 1 page.
"Cinemagraphs", Retrieved on: Feb. 17, 2014, Available at: http://cinemagraphs.com/about/, 1 page.
"Vine", Retrieved on: Feb. 17, 2014, Available at: https://play.google.com/store/apps/details?id=co.vine.android, 3 pages.
"International Preliminary Report on Patentability Issued in PCT Application No. PCT/US2015/017885", dated Jan. 5, 2016, 13 Pages.
"Office Action Issued in Russian Patent Application No. 2016136339", dated Nov. 18, 2016, 3 Pages.

* cited by examiner

METADATA-BASED PHOTO AND/OR VIDEO ANIMATION

BACKGROUND

In the area of photography, a new trend is emerging relating to animated photos and video. Photos are becoming more than just one single shot, and in many cases are being created out of multiple frames. As such, there is a movement to capture more than a single instant during capture. This can be seen in the revival of applications, such as Cinemagraph™ and Cinemagram®, which help users create animated Graphics Interchange Format (GIF) files, which are sometimes referred to as a hybrid between a photo and a video. Animated GIF files often are configured as looping videos. A looping video is a video created from multiple still images or multiple sections of video that are configured in a loop, such that the video is replayed automatically when the video ends. Vine Labs, Inc. is a company that has released a mobile application that enables users to create such looping videos. Echograph® is an application that uses animated GIF technology to enable users to insert movement into a still photo. Blink™, which was developed by Microsoft Corporation, also enables users to insert movement into a still photo.

SUMMARY

Various approaches are described herein for, among other things, providing metadata-based photo and/or video animation. For instance, multiple images (e.g., still images) of a scene may be combined into an image sequence. An image may be selected from the multiple images to represent the scene. Such an image may be referred to as a primary image. Metadata may be associated with the primary image. The metadata may include a reference to the image sequence. If a device supports photo and/or video animation, the device may use the reference in the metadata to access the image sequence and use the image sequence to represent the scene. If the device does not support photo and/or video animation, the device may use the primary image (or another image) to represent the scene.

Example systems and devices are described. A first example device includes a camera, control logic, image sequence logic, and metadata logic. The camera includes a user element which, when selected, initiates capture of one or more images. The control logic is configured to control the camera to capture a plurality of images in response to each selection of the user element. The image sequence logic is configured to generate an image sequence from each plurality of images. The metadata logic is configured to, for each plurality of images, associate metadata with a primary image selected from the plurality of images. For each plurality of images, the metadata includes a reference to the image sequence that is generated from the plurality of images.

A second example device includes display logic, interface logic, and gesture logic. The display logic is configured to receive primary images. Each primary image has metadata that includes a reference to a respective image sequence that is based on a respective plurality of images that includes the primary image. The interface logic is configured to provide a user interface that includes virtual elements. Each virtual element corresponds to a respective primary image and further corresponds to a respective image sequence that is referenced in the metadata of the respective primary image. The display logic is configured to, for each virtual element, display the primary image that corresponds to the virtual element in the virtual element. The gesture logic is configured to detect a gesture with regard to a designated virtual element. The display logic is configured to display the image sequence that corresponds to the designated virtual element in the designated virtual element instead of displaying the primary image that corresponds to the designated virtual element in the designated virtual element, in response to the gesture being detected with regard to the designated virtual element.

An example system includes a store, identification logic, capability logic, and provision logic. The store is configured to receive a primary image from a first device via a network. The primary image has metadata that includes a reference to a designated image sequence that is based on a plurality of images that includes the primary image. The primary image represents a profile of a first user. The store is further configured to receive a boot up indicator from a second device that is different from the first device via the network. The boot up indicator indicates that the second device is performing a boot up process. The identification logic is configured to determine that the first user is identified in a list of contacts associated with the second device. The capability logic is configured to determine whether the second device is capable of representing a contact using an image sequence. If the second device is capable of representing a contact using an image sequence, the provision logic retrieves the designated image sequence based on the reference and provides the designated image sequence to the second device to represent the profile of the first user. If the second device is not capable of representing a contact using an image sequence, the provision logic provides the primary image in lieu of the designated image sequence to the second device to represent the profile of the first user.

Example methods are also described. In a first example method, a camera having a user element is controlled to capture a plurality of images in response to each selection of the user element. An image sequence is generated from each plurality of images. For each plurality of images, metadata is associated with a primary image selected from the plurality of images. Each metadata includes a reference to the image sequence that is generated from the respective plurality of images.

In a second example method, primary images are received. Each primary image has metadata that includes a reference to a respective image sequence that is based on a respective plurality of images that includes the primary image. A user interface that includes virtual elements is provided. Each virtual element corresponds to a respective primary image and further corresponds to a respective image sequence of the plurality of image sequences that is referenced in the metadata of the respective primary image. For each virtual element, the primary image that corresponds to the virtual element is displayed in the virtual element. A gesture is detected with regard to a designated virtual element. The image sequence that corresponds to the designated virtual element, instead of the primary image that corresponds to the designated virtual element, is displayed in the designated virtual element in response to detecting the gesture with regard to the designated virtual element.

In a third example method, a primary image is received at a store from a first device via a network. The primary image has metadata that includes a reference to a designated image sequence that is based on a plurality of images that includes the primary image. The primary image represents a profile of a first user. A boot up indicator is received at the store from a second device that is different from the first device via the network. The boot up indicator indicates that the second device is performing a boot up process. A determination is made that the first user is identified in a list of contacts associated with the second device. A determination is made whether the second device is capable of representing a contact using an image sequence. If the second device is capable of representing a contact using an image sequence, the designated image sequence is retrieved based on the reference, and the designated image sequence is provided to the second device to represent the profile of the first user. If the second device is not capable of representing a contact using an image sequence, the primary image is provided in lieu of the designated image sequence to the second device to represent the profile of the first user.

Example computer program products are also described. A first example computer program product includes a computer-readable medium having computer program logic recorded thereon for enabling a processor-based system to provide metadata-based photo and/or video animation. The computer program logic includes a first program logic module, a second program logic module, and a third program logic module. The first program logic module is for enabling the processor-based system to control a camera, which has a user element, to capture a plurality of images in response to each selection of the user element. The second program logic module is for enabling the processor-based system to generate an image sequence from each plurality of images. The third program logic module is for enabling the processor-based system to, for each plurality of images, associate metadata with a primary image selected from the plurality of images. Each metadata includes a reference to the image sequence that is generated from the respective plurality of images.

A second example computer program product includes a computer-readable medium having computer program logic recorded thereon for enabling a processor-based system to provide metadata-based photo and/or video animation. The computer program logic includes a first program logic module, a second program logic module, a third program logic module, a fourth program logic module, and a fifth program logic module. The first program logic module is for enabling the processor-based system to receive primary images. Each primary image has metadata that includes a reference to a respective image sequence that is based on a respective plurality of images that includes the primary image. The second program logic module is for enabling the processor-based system to provide a user interface that includes virtual elements. Each virtual element corresponds to a respective primary image and further corresponds to a respective image sequence of the plurality of image sequences that is referenced in the metadata of the respective primary image. The third program logic module is for enabling the processor-based system to, for each virtual element, display the primary image that corresponds to the virtual element in the virtual element. The fourth program logic module is for enabling the processor-based system to detect a gesture with regard to a designated virtual element. The fifth program logic module is for enabling the processor-based system to display the image sequence that corresponds to the designated virtual element, instead of the primary image that corresponds to the designated virtual element, in the designated virtual element in response to detection of the gesture with regard to the designated virtual element.

A third example computer program product includes a computer-readable medium having computer program logic recorded thereon for enabling a processor-based system to selectively provide metadata-based photo and/or video animation. The computer program logic includes a first program logic module, a second program logic module, a third program logic module, a fourth program logic module, and a fifth program logic module. The first program logic module is for enabling the processor-based system to receive a primary image from a first device via a network. The primary image has metadata that includes a reference to a designated image sequence that is based on a plurality of images that includes the primary image. The primary image represents a profile of a first user. The second program logic module is for enabling the processor-based system to receive a boot up indicator from a second device that is different from the first device via the network. The boot up indicator indicates that the second device is performing a boot up process. The third program logic module is for enabling the processor-based system to determine that the first user is identified in a list of contacts associated with the second device. The fourth program logic module is for enabling the processor-based system to determine whether the second device is capable of representing a contact using an image sequence. The fifth program logic module is for enabling the processor-based system to, if the second device is capable of representing a contact using an image sequence, retrieve the designated image sequence based on the reference and provide the designated image sequence to the second device to represent the profile of the first user. The fifth program logic module is further for enabling the processor-based system to, if the second device is not capable of representing a contact using an image sequence, provide the primary image in lieu of the designated image sequence to the second device to represent the profile of the first user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
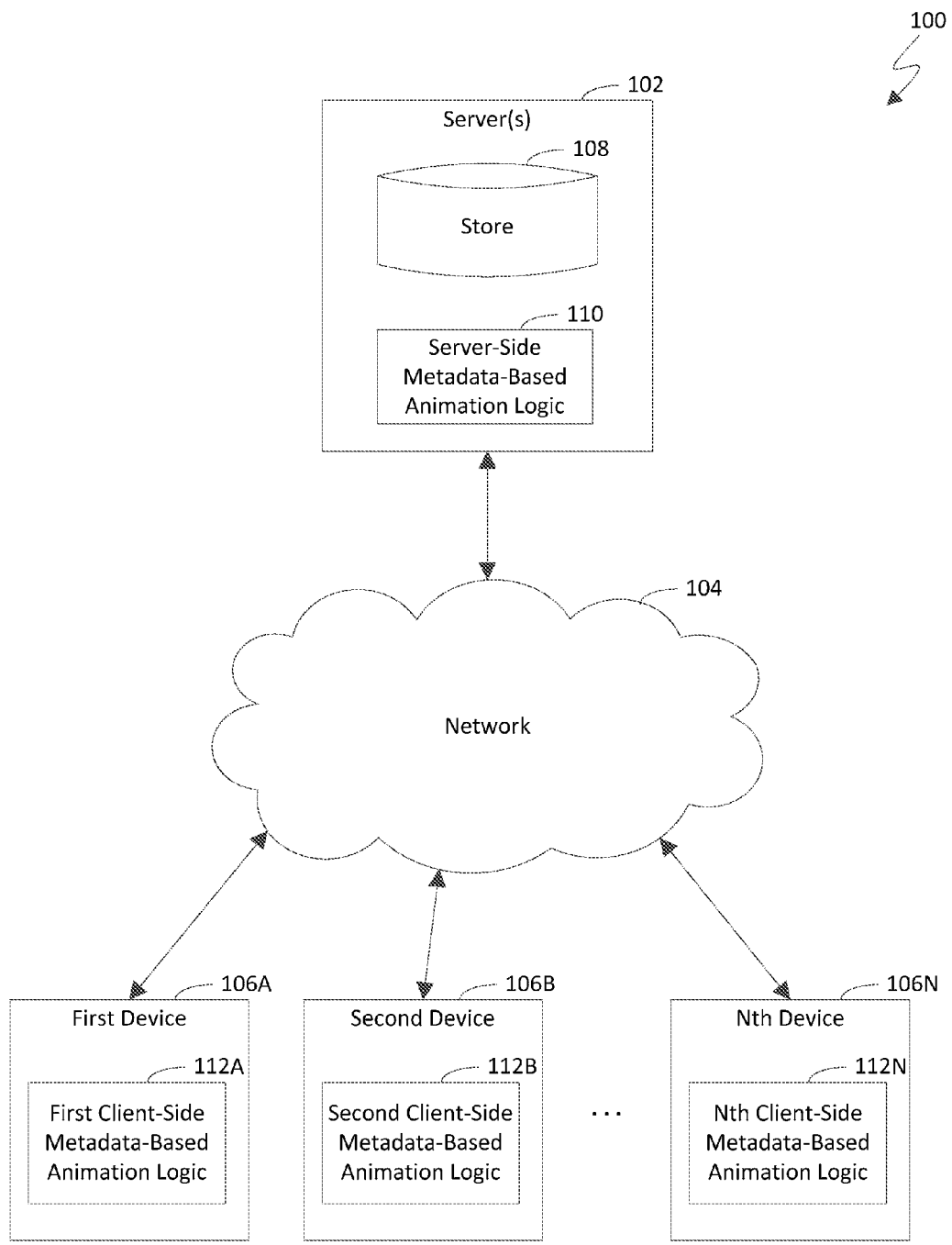
FIG. 1 is a block diagram of an example metadata-based animation system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of providing metadata-based photo and/or video animation. For instance, multiple images (e.g., still images) of a scene may be combined into an image sequence. An image may be selected from the multiple images to represent the scene. Such an image may be referred to as a primary image. Metadata may be associated with the primary image. The metadata may include a reference to the image sequence. If a device supports photo and/or video animation, the device may use the reference in the metadata to access the image sequence and use the image sequence to represent the scene. If the device does not support photo and/or video animation, the device may use the primary image (or another image) to represent the scene.

Example techniques described herein have a variety of benefits as compared to conventional techniques for displaying photos and videos. For instance, the example techniques may be capable of providing photo and/or video animation for devices that have the capability to support the animation, while providing static images in lieu of animation for devices that do not have the capability to support the animation. The example techniques may provide a more personal and/or emotional user experience, as compared to conventional techniques. The example techniques may be capable of causing multiple shots to be taken with each capture that is performed by a camera (e.g., by default). The resulting information, including the multiple shots, may be persisted for a specified duration of time, which may enable a user to later determine which image among the multiple shots is to be selected to represent the moment that was captured. The example techniques may delete animations (e.g., under specified conditions) in response to passage of a designated period of time (e.g., to limit or reduce an amount of storage that is consumed). The example techniques may be applicable to multiple static images, video (e.g., keyframes of a video), etc. The example techniques may be capable of causing photo and/or video animation to be provided in any of a variety of contexts of a device, such as on a lock screen, a start menu, a call screen, contact tile(s), a photo hub, a photo gallery viewer, a single photo viewer, etc. Such animation may be provided automatically (e.g., without a user performing an operation to cause the animation to occur) and/or in real-time. The example techniques or aspects thereof may be performed manually by a user, automatically by a backend service, or by a third-party application.

FIG. 1 is a block diagram of an example metadata-based animation system 100 (hereinafter "system 100") in accordance with an embodiment. Generally speaking, system 100 operates to provide information to users in response to requests (e.g., hypertext transfer protocol (HTTP) requests) that are received from the users. The information may include documents (e.g., Web pages, images, video files, etc.), output of executables, and/or any other suitable type of information. In accordance with example embodiments described herein, system 100 provides metadata-based photo and/or video animation. For instance, such animation may be used in lieu of static images in any of a variety of contexts of a device. Detail regarding techniques for providing metadata-based photo and/or video animation is provided in the following discussion.

As shown in FIG. 1, system 100 includes server(s) 102, network 104, and a plurality of devices 106A-106N. Communication among server(s) 102 and devices 106A-106N is carried out over network 104 using well-known network communication protocols. Network 104 may be a wide-area network (e.g., the Internet), a local area network (LAN), another type of network, or a combination thereof.

Devices 106A-106N are processing systems that are capable of communicating with server(s) 102. An example of a processing system is a system that includes at least one processor that is capable of manipulating data in accordance with a set of instructions. For instance, a processing system may be a computer, a personal digital assistant, etc. Devices 106A-106N are configured to provide requests to server(s) 102 for requesting information stored on (or otherwise accessible via) server(s) 102. For instance, a user may initiate a request for executing a computer program (e.g., an application) using a client (e.g., a Web browser, Web crawler, or other type of client) deployed on a device 106 that is owned by or otherwise accessible to the user. In accordance with some example embodiments, devices 106A-106N are capable of accessing domains (e.g., Web sites) hosted by server(s) 102, so that devices 106A-106N may access information that is available via the domains. Such domain may include Web pages, which may be provided as hypertext markup language (HTML) documents and objects (e.g., files) that are linked therein, for example.

It will be recognized that each of devices 106A-106N may include any client-enabled system or device, including but not limited to a desktop computer, a laptop computer, a tablet computer, a wearable computer such as a smart watch or a head-mounted computer, a personal digital assistant, a cellular telephone, or the like.

Devices 106A-106N are shown to include respective client-side metadata-based animation logic 112A-112N. Each of the devices 106A-106N and each of the animation logic 112A-112N will now be referred to generally as device 106 and animation logic 112, respectively, for ease of discussion. Each animation logic 112 is configured to provide photo and/or video animation with regard to the device 106 that includes the respective animation logic 112. For instance, animation logic 112 may generate an image sequence from a plurality of images or receive the image sequence from server(s) 102 via network 104. Animation logic 112 may display (e.g., automatically display, display by default, etc.) the image sequence in lieu of a static image in any of a variety of contexts of the device 106. For instance, the static image may have metadata (e.g., XF metadata) that references (e.g., links to) the image sequence. Animation logic 112 may retrieve the image sequence based on the reference and display the image sequence in one or more contexts in which the static image would otherwise be displayed. For instance, the image sequence may be stored in a folder that is different from a folder in which the static image is stored.

Examples of a context include but are not limited to a lock screen context, a start menu context, a call screen context, a contact context, a photo hub context, a photo gallery viewer context, a single photo viewer context, a pinned photo album context, a camera roll context, an online album context, a favorite photos context, etc. Displaying an image sequence in a lock screen context of a device includes displaying the image sequence on a lock screen of the device. A lock screen is an interface element that is displayed to indicate that an action is needed in order for access to at least some functionality of the device to be granted.

Displaying an image sequence in a start menu context of a device includes displaying the image sequence in a start menu (a.k.a. start screen) of the device. A start menu is an interface element that is displayed to provide a central virtual location from which to launch application(s) and/or task(s). For instance, the start menu may be a first interface element that is displayed to a user when the user logs into the device.

Displaying an image sequence in a call screen context of a device includes displaying the image sequence in an interface element that is displayed by the device when a call (e.g., telephone call, voice over internet protocol (VoIP) call, etc.) is received at the device.

Displaying an image sequence in a contact context of a device includes displaying the image sequence in an interface element that represents a contact included in a contacts list of a user. For instance, the interface element may be a contact tile.

Displaying an image sequence in a photo hub context of a device includes displaying the image sequence in an interface element that represents a folder through which to access photos that are stored on the device.

Displaying an image sequence in a photo gallery viewer context of a device includes displaying the image sequence in an interface element that includes a plurality of representations of a plurality of respective visual contents. Each visual content may be a static image or a dynamic image. For instance, each visual content may be a photograph, a video, or other type of file that includes data that is usable for generating an image.

Displaying an image sequence in a single photo viewer context of a device includes displaying the image sequence in an interface element that includes a single representation of a single visual content.

Displaying an image sequence in a pinned photo album context of a device includes displaying the image sequence in a virtual photo album that is attached to a virtual location (e.g., in a user interface of the device, in a social update, etc.).

Displaying an image sequence in a camera roll context of a device includes displaying the image sequence in a list of photos that are taken by the device.

Displaying an image sequence in an online album context of a device includes displaying the image sequence in a virtual photo album that the device accesses via the Internet.

Displaying an image sequence in a favorite photos context of a device includes displaying the image sequence in an interface element that includes representations of photos that are indicated to have a higher priority than other photos.

Server(s) 102 are one or more processing systems that are capable of communicating with devices 106A-106N. Server(s) 102 are configured to execute computer programs that provide information to users in response to receiving requests from the users. For example, the information may include documents (e.g., Web pages, images, video files, etc.), output of executables, or any other suitable type of information. In accordance with some example embodiments, server(s) 102 are configured to host one or more Web sites, so that the Web sites are accessible to users of system 100.

Server(s) 102 are shown to include a store 108 and server-side metadata-based animation logic 110 (hereinafter "animation logic 110"). Animation logic 110 is configured to download image sequences that are associated with static images and/or references to the image sequences to devices. For instance, animation logic 110 may receive a notification from each device 106 when the device 106 is turned on. Such notification may indicate that information, such as contacts, emails, calendar items, etc. are to be downloaded to the device 106. Animation logic 110 may download static images that are included in such information, along with metadata that includes references to image sequences that correspond to the static images.

Animation logic 110 may determine whether a device 106 is capable of displaying an image sequence in lieu of a static image to determine whether image sequence(s) are to be downloaded to the device 106. If the device 106 is capable of displaying an image sequence in lieu of a static image, animation logic 110 may download image sequences that are associated with static images to the device 106. If the device 106 is not capable of displaying an image sequence in lieu of a static image, animation logic 110 may download the static images, but not the image sequences that are associated with the static images, to the device 106.

Animation logic 110 may receive an image sequence from a first user and provide the image sequence to one or more second users based on the information that is to be downloaded to each of the one or more second users including at least one static image that is associated with the image sequence. For example, the first user may provide the image sequence to represent a profile of the first user. In accordance with this example, animation logic 110 may provide the image sequence to each of the one or more second user(s) based on the first user being listed as a contact of the respective second user. In further accordance with this example, animation logic 110 may provide the image sequence to each of the one or more second user(s) further based on the device 106 of each second user being able to display an image sequence in lieu of a static image.

Store 108 stores information that is to be downloaded among devices 106A-106N. Such information may include but is not limited to contacts, emails, calendar items, etc. that are associated with the users of devices 106A-106N. The information may include visual contents. For instance, a visual content may be a static image or a dynamic image. A visual content may be a photograph, a video, or other type of file that includes data that is usable for generating an image. Store 108 may be any suitable type of store, including but not limited to a database (e.g., a relational database, an entity-relationship database, an object database, an object relational database, an XML database, etc.).

Each of animation logic 110 and animation logic 112A-112N may be implemented in various ways to provide metadata-based photo and/or video animation, including being implemented in hardware, software, firmware, or any combination thereof. For example, each of animation logic 110 and animation logic 112A-112N may be implemented as computer program code configured to be executed in one or more processors. In another example, each of animation logic 110 and animation logic 112A-112N may be implemented as hardware logic/electrical circuitry. In an embodiment, each of animation logic 110 and animation logic 112A-112N may be implemented in a system-on-chip (SoC). Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Example techniques for providing metadata-based photo and/or video animation are discussed in greater detail below with reference to FIGS. 2-14.

Figure 2:
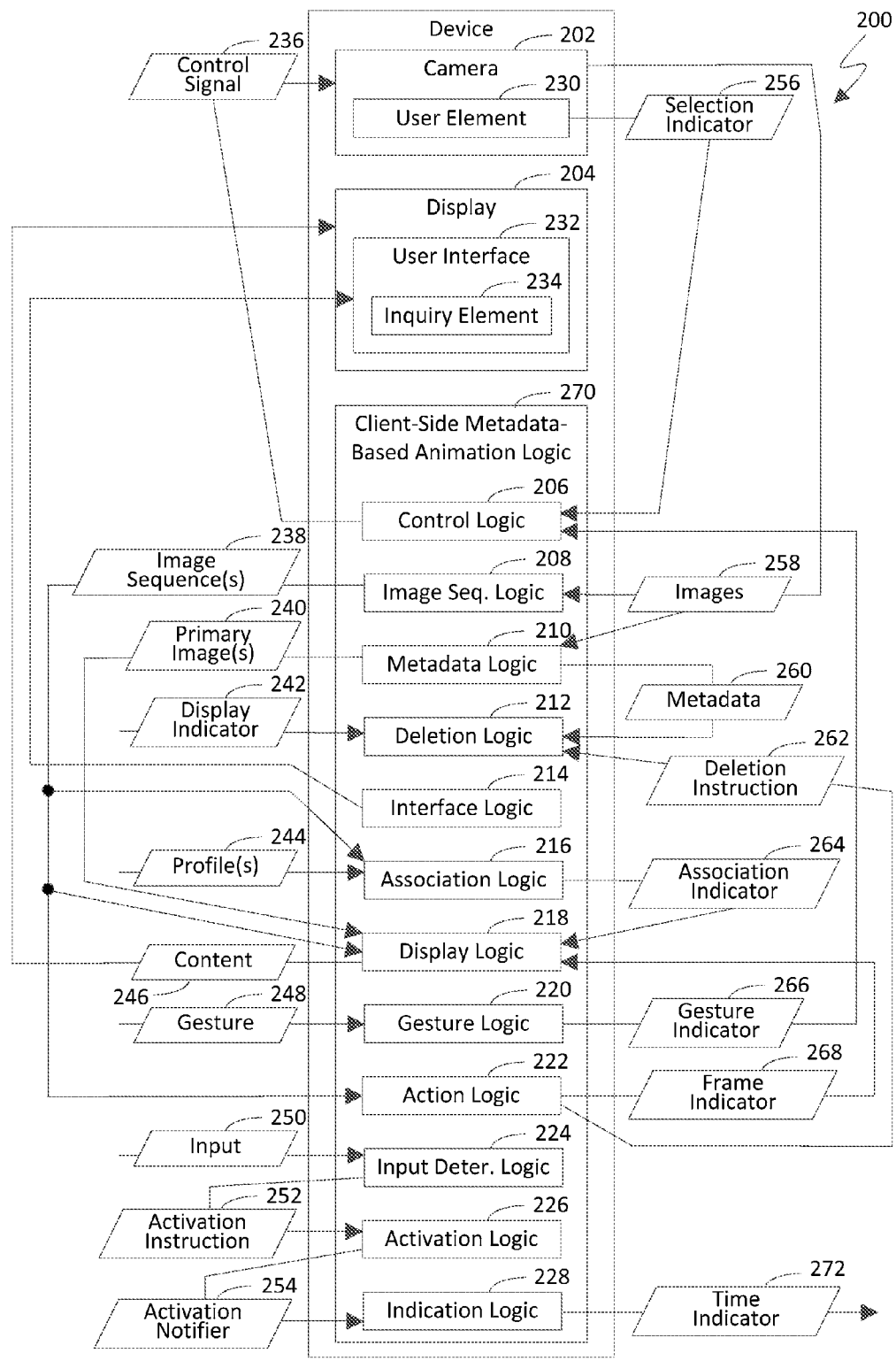
FIG. 2 is a block diagram of an example implementation of a device shown in FIG. 1 in accordance with an embodiment.
Figure 3:
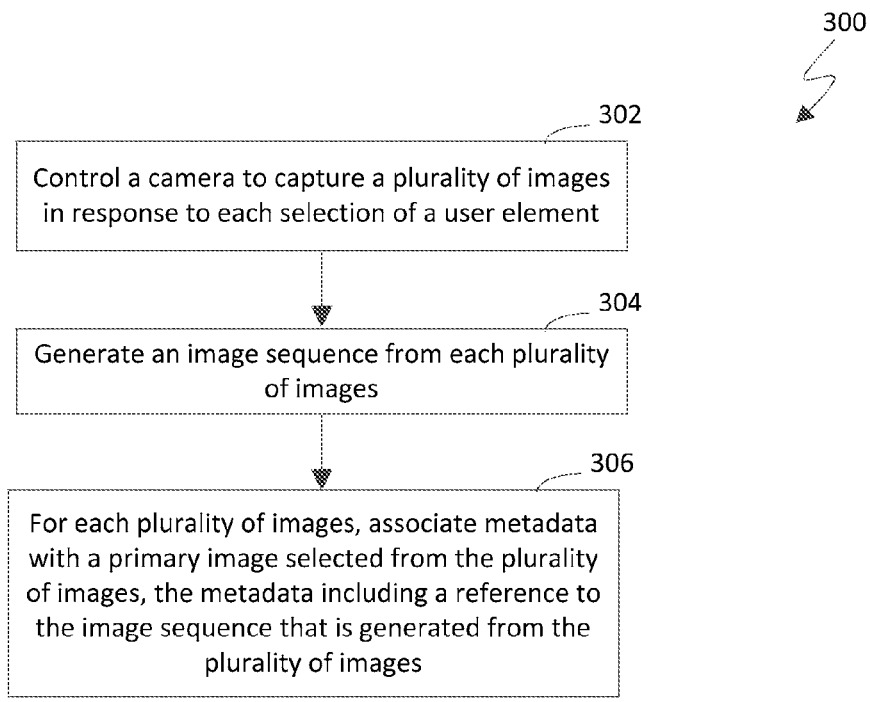
FIGS. 3-10 depict flowcharts of example methods for providing metadata-based photo and/or video animation from a perspective of a device shown in FIG. 1 in accordance with embodiments.

FIG. 2 is a block diagram of a device 200, which is an example implementation of device 100 shown in FIG. 1, in accordance with an embodiment. For instance, device 200 may be a mobile device (e.g., a personal digital assistant, a cell phone, a tablet computer, a laptop computer, or a wearable computer such as a smart watch or a head-mounted computer), though the scope of the example embodiments is not limited in this respect.

As shown in FIG. 2, device 200 includes a camera 202, a display 204, and client-side metadata-based animation logic 270 ("hereinafter "animation logic 270"). Camera 202 is configured to capture images 258 (e.g., real-world images). Camera 202 includes a user element 230 which, when selected, causes camera 202 to capture one or more of the images 258. User element 230 generates a selection indicator 256 in response to each selection of user element 230 to indicate that user element 230 is selected.

Display 204 enables a user of device 200 to view images that are displayed via display 204. Display 204 includes a user interface 232, which is configured to convey information to a user of display 204 and/or receive input from the user. User interface 232 is shown to include an inquiry element 234 for illustrative purposes and is not intended to be limiting. Inquiry element 234 is configured to solicit a response from the user of device 200.

In an example embodiment, device 200 is a touch-enabled device. For instance, display 204 may be a touch screen. In accordance with this embodiment, display 204 may be capable of detecting a hover gesture. A gesture is a communication, which is performed by a user of a device (e.g., device 200), in which placement and/or motion of at least a portion of the user's body and/or movement of the device within an environment of the device communicates information to the device. A hover gesture is a gesture in which at least one hand or portion thereof (e.g., one or more fingers) of a user is positioned at a spaced distance above the touch screen. The touch screen can detect that the user's hand (or portion thereof) is proximate to the touch screen, such as through capacitive sensing. Additionally, hand movement and/or finger movement can be detected while the hand and/or finger(s) are hovering. A hover gesture is capable of occurring without the user physically touching a touch screen of a touch-enabled device.

Animation logic 270 is configured to provide metadata-based photo and/or video animation with regard to device 200. Animation logic 270 is shown to be external to camera 202 in FIG. 2 for illustrative purposes and is not intended to be limiting. It will be recognized that animation logic 270 (or any portion thereof) may be included in camera 202. Animation logic 270 includes control logic 206, image sequence logic 208, metadata logic 210, deletion logic 212, interface logic 214, association logic 216, display logic 218, gesture logic 220, action logic 222, input determination logic 224, activation logic 226, and indication logic 228. Control logic 206 is configured to control camera 202. Control logic 206 generates a control signal 236, which controls a manner in which camera 202 operates. For instance, control logic 206 may provide the control signal 236 in response to receipt of the selection indicator 256. For example, control logic 206 may configure control signal 236 to cause camera 202 to capture a single image in response to a selection of user element 230. In another example, control logic 206 may configure control signal 236 to cause camera 202 to capture multiple images in response to a selection of user element 230. For instance, control logic 206 may control camera 202 to capture multiple images in response to each selection of user element 230 (e.g., by default).

In an example embodiment, control logic 206 controls camera 202 to capture multiple images in accordance with a burst photography mode of device 200. A burst photography mode enables multiple photographs to be captured in relatively quick succession in response to a selection of user element 230. In another example embodiment, control logic 206 controls camera 202 to capture multiple images in accordance with a video mode of device 200.

In yet another example embodiment, control logic 206 is configured to control which image(s), image sequence(s), video(s), etc. are to be displayed with regard to representations (e.g., virtual elements) that are included in user interface 232. In an aspect, a representation, which is selected to be displayed, may be set to be the primary image from a captured plurality of images. In accordance with this aspect, control logic 206 may be configured to change the representation from the primary image to an image sequence that is generated from the captured plurality of images in response to a triggering event. The triggering event may be receipt of input from a user of device 200, for example. For instance, the input may be a gesture, such as a hover gesture with regard to device 200, a shaking of device 200, etc.

In another aspect, control logic 206 may control whether an image sequence is displayed with regard to a representation that is included in user interface 232 based on any of a variety of criteria. For example, control logic 206 may determine that the image sequence is not to be displayed (e.g., that a corresponding primary image is to be displayed in lieu of the image sequence) based on a threshold number of other image sequences being displayed in user interface 232. The threshold number may be any suitable number, such as 1, 2, 3, etc.

In another example, control logic 206 may cause a designated number of image sequences at a time to be displayed with respect to their corresponding representations in user interface 232. In accordance with this example, control logic 206 may cause a first subset of image sequences to be displayed with respect to their corresponding representations during a first period of time; control logic 206 may cause a second subset of the image sequences to be displayed with respect to their corresponding representations during a second period of time that follows the first period of time; control logic 206 may cause a third subset of the image sequences to be displayed with respect to their corresponding representations during a third period of time that follows the second period of time, and so on. The designated number of image sequences may be any suitable number, such 1, 2, 3, etc. Control logic 206 may select the image sequences to be displayed randomly, semi-randomly (e.g., randomly within a subset of the image sequences that is based on one or more designated criteria), or non-randomly (e.g., methodically or orderly).

Image sequence logic 208 is configured to generate image sequence(s) 238 from respective subset(s) of the images 258. Each subset includes a respective plurality of images that are included in images 258. Each of the image sequence(s) 238 may be used in lieu of a single image from the respective subset to represent a scene. A scene may include any one or more objects. Each object may be animate or inanimate.

Image sequence logic 208 may be configured to identify an image in each plurality of images at which the respective image sequence is to begin. For instance, image sequence logic 208 may identify the image based on the image including motion, one or more faces (e.g., human faces), etc. Image sequence logic 208 may use vector analysis (or other kind of analysis) to identify the image in each plurality of images at which the respective image sequence is to begin. Some example techniques for identifying an image using vector analysis are discussed below with respect to action logic 222.

Each image sequence may have any suitable format. For example, image sequence logic 208 may convert a plurality of images into an image sequence having a designated bitmap image format. In accordance with this example, the image sequence may be configured as an animated Graphics Interchange Format (GIF) file, an MP4 file, a file having a custom (e.g., proprietary) format, etc. In another example, image sequence logic 208 may create a control that generates an image sequence from a plurality of images. In yet another example, an image sequence may be a video.

It will be recognized that an image sequence may be formatted, for example using a software development kit (SDK), for a third-party application. For instance, the third-party application may be configured to push the image sequence to device 200. It will also be recognized that image sequence logic 208 need not necessarily generate each of the image sequence(s) 238. For instance, one or more of the image sequence(s) 238 may be received from a store that is remote from device 200, such as store 108 in FIG. 1, or from a store that is internal to device 200.

It should be noted that a user of device 200 may be allowed to set or modify an animation behavior of an image sequence. For instance, user interface 232 may present options for the image sequence to be configured as a one-time loop, an indefinite loop, to loop from start to finish to start to finish, to loop from start to finish and from finish to start, to animate a portion (i.e., less than all) of each frame in the image sequence, etc. Image sequence logic 208 may be configured to generate the image sequence in accordance with user input regarding the options that are selected by the user.

Metadata logic 210 is configured to associate respective metadata with a respective image that is referred to as a primary image in each subset. The metadata that is associated with each primary image includes a reference to the image sequence that is generated from the subset that includes the primary image. Each reference may be a link (e.g., a hyperlink) to the respective image sequence, though the scope of the example embodiments is not limited in this respect. The primary image(s) are referred to collectively as primary image(s) 240. The metadata associated with the primary image(s) is referred to collectively as metadata 260.

Deletion logic 212 is configured to delete metadata associated with a respective primary image under specified condition(s). For example, deletion logic 212 may be configured to delete each metadata in response to passage of a specified duration of time (e.g., in accordance with a default setting of device 200). In accordance with this example, the specified duration of time for each metadata may start at a time instance at which the metadata is associated with a respective primary image. The specified duration of time may be any suitable duration, such as four hours, eight hours, one day, five days, seven days, two weeks, thirty days, a month, etc.

Deletion logic 212 may be further configured to delete each image sequence under the specified condition(s). Deletion logic may be further configured to delete each image of each plurality of images other than the primary image in each plurality of images under the specified condition(s). Deletion logic 212 may delete metadata, an image sequence, and/or each image in a plurality of images other than the primary image in the plurality of images in response to receipt of a deletion instruction 262, which specifies that the same is to be deleted.

In an example embodiment, deletion logic 212 is configured to override the default setting of device 200 by not deleting designated metadata in response to the image sequence that is referenced by the designated metadata being selected to be displayed in lieu of a static image (e.g., in lieu of the primary image that has the designated metadata). Display indicator 242 may indicate that the image sequence that is referenced by the designated metadata is selected to be displayed. Accordingly, display logic 212 may override the default setting in response to receipt of the display indicator 242.

In another example embodiment, deletion logic 212 is configured to override the default setting of device 200 by deleting designated metadata prior to the passage of the specified duration of time in response to a single image from the plurality of images that corresponds to the designated metadata being selected to be displayed prior to the passage of the specified duration of time. Display indicator 242 may indicate that a single image from the plurality of images that corresponds to the designated metadata is selected to be displayed. Accordingly, display logic 212 may override the default setting in response to receipt of the display indicator 242.

Interface logic 214 is configured to provide (e.g., generate) user interface 232. In an example embodiment, interface logic 214 is configured to provide user interface 232 including inquiry element 230 to solicit a response from a user of device 200 regarding the specified duration of time after which metadata is to be deleted. In accordance with this embodiment, interface logic 214 is further configured to define the specified duration of time based on the response that is received from the user. For instance, the response may be a voice command, selection of the specified duration of time from multiple durations of time that are displayed via user interface 232, textual input, etc.

In another example embodiment, interface logic 214 is configured to provide user interface 232 to enable a user of device 200 to select a designated profile with which to associate an image sequence. For example, the designated profile may be a profile of the user. In another example, the designated profile may be a profile of a contact of the user. In accordance with this example, the contact may be identified in a list of contacts stored on device 200 and/or stored remote from device 200 at a store, such as store 108 in FIG. 1.

Association logic 216 is configured to associate image sequences with profile(s) 244. For example, each profile may represent a contact of a user of device 200, though the scope of the example embodiments is not limited in this respect. In accordance with this example, each profile may be selectable from a plurality of contacts of the user via user interface 232. In further accordance with this example, association logic 216 may be configured to associate a specified image sequence with a profile in response to selection of the profile from the plurality of contacts.

Display logic 218 is configured to display content 246 via display 204. Content 246 may be static image(s), image sequence(s), etc. For example, display logic 218 may be configured to display an image sequence in each of a plurality of contexts of device 200 in which a representation of a profile that is associated with the image sequence is to be displayed. In accordance with this example, the plurality of contexts may include a call screen context and/or a contact context.

Gesture logic 220 is configured to detect a gesture with respect to device 200. A gesture is communication, which is performed by a user of a device (e.g., device 200), in which placement and/or motion of at least a portion of the user's body and/or movement of the device within an environment of the device communicates information to the device. Examples of a gesture include but are not limited to a hover gesture (e.g., waving a hand, pointing, hovering for at least a threshold period of time, flicking a finger, swiping a palm or finger(s) of the hand, pinching fingers together, moving fingers apart, etc. without touching the touch screen), a gaze gesture (e.g., gazing for at least a threshold period of time), a look-and-blink gesture (e.g., blinking while looking), a voice gesture (e.g., saying a command), a touch gesture (e.g., tapping a finger, swiping a finger, pinching fingers together, moving fingers apart, etc. against the touch screen), etc. or any combination thereof.

Gesture logic 220 may sense the placement and/or motion of the portion(s) of the user's body and/or the movement of device 200 in an environment of device 200. Gesture logic 220 may determine an action to take in response to detection of the placement, motion, and/or movement. Gesture logic 220 may be coupled to or incorporated into display 204 to detect a hover gesture with respect to display 204. In accordance with this example, gesture logic 220 may be capable of detecting a hover gesture that is performed above and/or adjacent to (e.g., to a side of) display 204.

Action logic 222 is configured to determine whether object(s) are in motion in frames of an image sequence. For instance, action logic 22 may determine a frame in an image sequence that depicts initiation of an action. For instance, action logic 222 may use vector analysis (or other kind of analysis) to determine a change of location of an object from a first frame to a second frame. For instance, action logic 222 may determine that the object changes from a first location in the first frame to a second location in the second frame. Action logic 222 may determine a rate at which the object moves based on a distance between the first location and the second location and a difference between a first time instance that is associated with the first frame and a second time instance that is associated with the second frame. For instance, the difference between the first time instance and the second time instance may be based on a frame rate of the image sequence. Other techniques known in the relevant art may be used in addition to or in lieu of the techniques described herein to determine whether object(s) are in motion in frames of an image sequence.

Input determination logic 224 is configured to determine whether input from a user is received. For instance, input determination logic 224 may be capable of determining a type of input that is received from the user. Example types of input include but are not limited to speech input, touch input, hover input, stylus input (i.e., input using a stylus), keyboard input (i.e., input using a keyboard), gesture input, etc. Input determination logic 224 may determine that one or more virtual elements are selected by such input.

Activation logic 226 is configured to activate a link to a subset of the images 258 in response to selection of a virtual element that corresponds to an image sequence that is based on the subset. For instance, activating the link may provide additional information about the image sequence, context(s) of device 200 in which the image sequence may be displayed, the subset of the images 258, a primary image in the subset, etc.

Image sequence(s) 238 may be deleted in response to passage of a designated period of time. Indication logic 228 is configured to provide an indicator that specifies a time instance at which one or more of the image sequence(s) 238 is to be deleted.

The various elements of device 200, including the various logic in animation logic 270, will now be described in greater detail with reference to FIGS. 3-9.

FIGS. 3-10 depict flowcharts 300, 400, 500, 600, 700, 800, 900, and 1000 of example methods for providing metadata-based photo and/or video animation in accordance with embodiments. For illustrative purposes, flowcharts 300, 400, 500, 600, 700, 800, 900, and 1000 are described with respect to device 200 shown in FIG. 2. Further structural and operational embodiments will be apparent to persons skilled in the relevant art(s) based on the discussion regarding flowcharts 300, 400, 500, 600, 700, 800, 900, and 1000.

As shown in FIG. 300, the method of flowchart 300 begins at step 302. In step 302, a camera is controlled to capture a plurality of images in response to each selection of a user element. In an example implementation, control logic 206 controls camera 202 to capture the plurality of images in response to each selection of user element 230.

For example, control logic may control camera 202 to capture a plurality of images in response to each selection of user element 230 in accordance with a burst photography mode of device 200. In another example, control logic may control camera 202 to capture a plurality of images in response to each selection of user element 230 in accordance with a video mode of device 200.

It will be recognized that each plurality of images need not necessarily be captured by camera 202. For instance, any plurality of images may be retrieved from a store on device 200 or on a server that is remote from device 200. Any plurality of images may be derived from one or more images that are stored on device 200 or on a server that is remote from device 200. Any plurality of images may be configured as a video for example.

At step 304, an image sequence is generated from each plurality of images. In an example implementation, image sequence logic 208 generates an image sequence from each plurality of images. For example, image sequence logic 208 may convert each plurality of images into a respective image sequence having a designated bitmap image format, such as Graphics Interchange Format (GIF). In another example, image sequence logic 208 may create a control that generates the respective image sequence from each plurality of images.

At step 306, for each plurality of images, metadata is associated with a primary image selected from the plurality of images. The metadata that is associated with each primary image includes a reference to the image sequence that is generated from the plurality of images from which the primary image is selected. The primary image may be configured to have a designated format, such as a JPEG format, though the scope of the embodiments is not limited in this respect. In an example implementation, for each plurality of images, metadata logic 210 associates metadata with a primary image selected from the plurality of images.

In some example embodiments, one or more steps 302, 304, and/or 306 of flowchart 300 may not be performed. Moreover, steps in addition to or in lieu of steps 302, 304, and/or 306 may be performed. For instance, in an example embodiment, the method of flowchart 300 includes deleting each metadata in response to passage of a specified duration of time in accordance with a default setting of a device that includes the camera unless at least one of one or more specified criteria is satisfied. For instance, deletion logic 212 may delete each metadata in response to the passage of the specified duration of time unless at least one of the one or more specified criteria is satisfied.

In an aspect, the one or more specified criteria include a criterion that the image sequence that is referenced by the respective metadata is selected to be displayed in lieu of a static image. For instance, the static image may be the primary image that has the respective metadata. In accordance with this aspect, display indicator 242 may indicate that the image sequence that is referenced by the respective metadata is selected to be displayed in lieu of a static image. Accordingly, deletion logic 212 may not delete the respective metadata based on receipt of the display indicator 242.

In another aspect, a respective metadata may be deleted, in response to a single image from the plurality of images that corresponds to the respective metadata being selected to be displayed, without regard to whether the passage of the specified duration of time occurs. In accordance with this aspect, the display indicator 242 may indicate that a single image from the plurality of images that corresponds to the respective metadata is selected to be displayed. Accordingly, deletion logic 212 may delete the respective metadata based on receipt of the display indicator 242.

Figure 4:
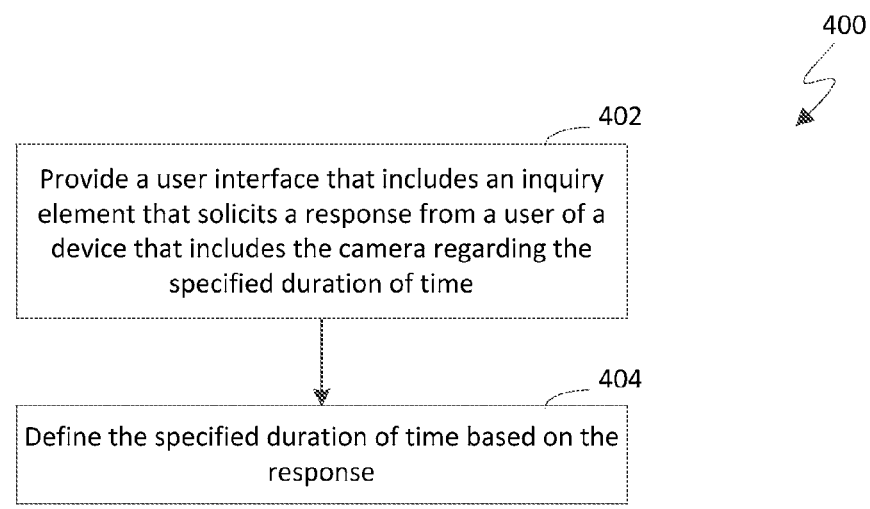

In another example embodiment, the method of flowchart 300 may include one or more of the step shown in flowchart 400 of FIG. 4. As shown in FIG. 4, the method of flowchart 400 begins at step 402. In step 402, a user interface is provided that includes an inquiry element that solicits a response from a user of a device that includes the camera regarding the specified duration of time. In an example implementation, interface logic 214 provides user interface 232, which includes inquiry element 234.

At step 404, the specified duration of time is defined based on the response. In an example implementation, interface logic 214 defines the specified duration of time.

Figure 5:
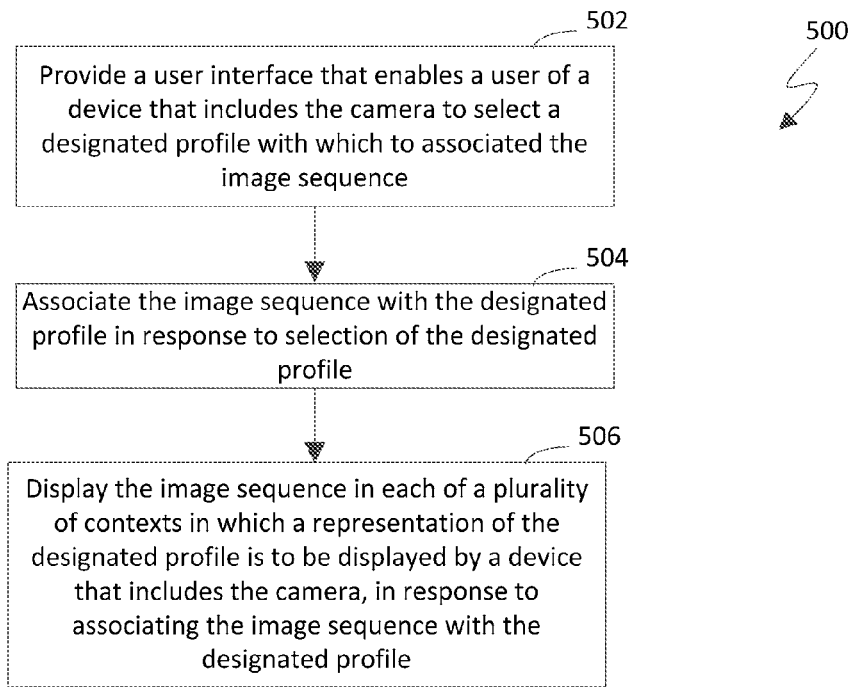

In yet another example embodiment, the method of flowchart 300 may include one or more of the steps shown in flowchart 500 of FIG. 5. As shown in FIG. 5, the method of flowchart 500 begins at step 502. In step 502, a user interface is provided that enables a user of a device that includes the camera to select a designated profile with which to associated the image sequence. In an example implementation, interface logic 214 provides user interface 232, which enables a user of device 200 to select the designated profile.

At step 504, the image sequence is associated with the designated profile in response to selection of the designated profile. In an example implementation, association logic 216 associates the image sequence with the designated profile. For instance, association logic 216 may locate the designated profile in profile(s) 244. Association logic 216 may generate association indicator 264 to indicate that the image sequence is associated with the designated profile.

At step 506, the image sequence is displayed in each of a plurality of contexts in which a representation of the designated profile is to be displayed by a device that includes the camera, in response to associating the image sequence with the designated profile. In an example implementation, display logic 218 displays the image sequence in each of the plurality of contexts of device 200. For instance, display logic 218 may display the image sequence in each of the plurality of contexts based on receipt of the association indicator 264.

Figure 6:
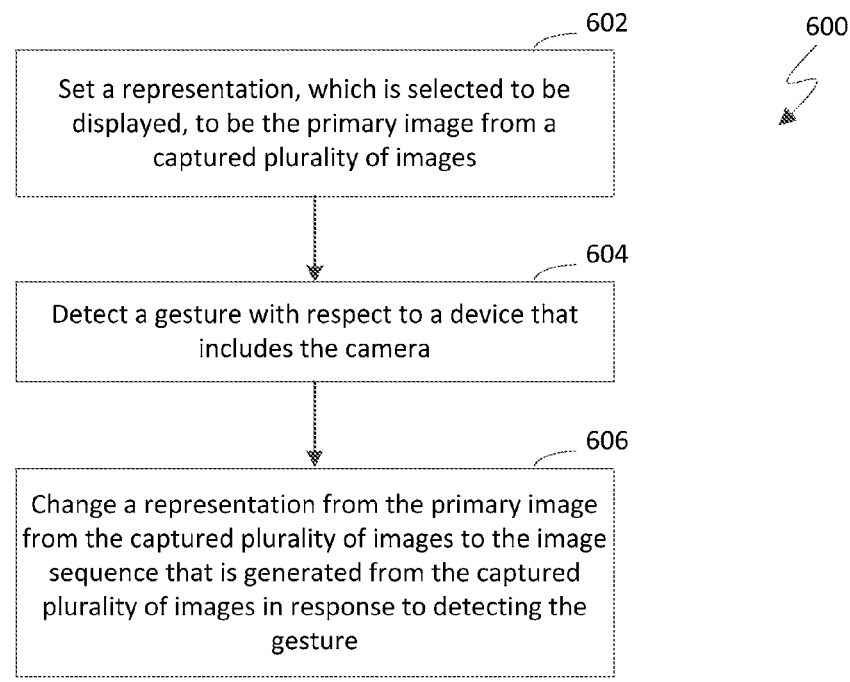
Figure 7:
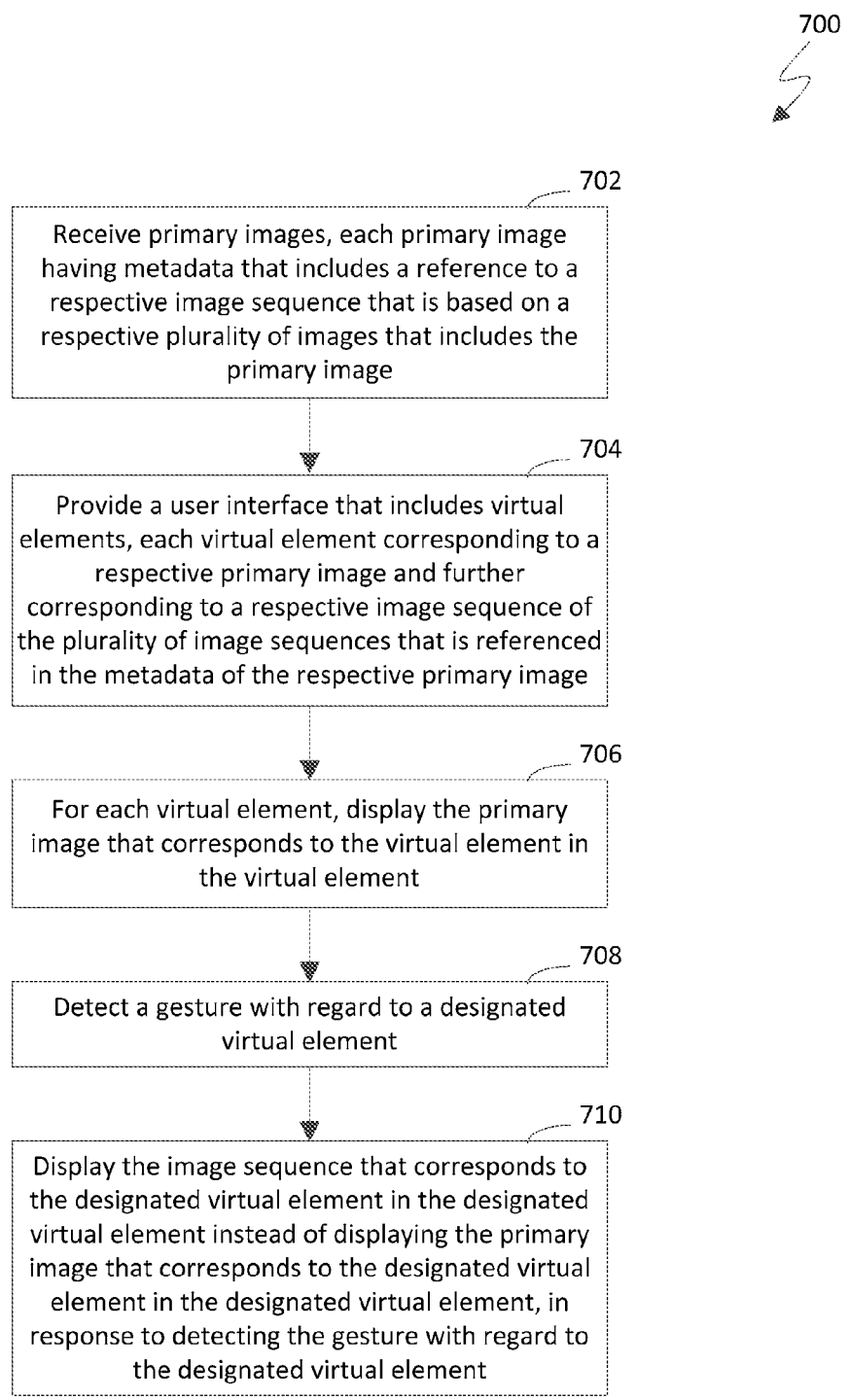

In still another example embodiment, the method of flowchart 300 may include one or more of the steps shown in flowchart 600 of FIG. 6. As shown in FIG. 6, the method of flowchart 600 begins at step 602. In step 602, a representation, which is selected to be displayed, is set to be the primary image from a captured plurality of images. In an example implementation, control logic 206 sets the representation to be the primary image.

At step 604, a gesture is detected with respect to a device that includes the camera. In an example implementation, gesture logic 220 detects gesture 248 with respect to device 200. For instance, gesture logic 220 may generate gesture indicator 266 to indicate that the gesture 248 is detected.

At step 606, the representation is changed from the primary image from the captured plurality of images to the image sequence that is generated from the captured plurality of images in response to detecting the gesture. In an example implementation, control logic 206 changes the representation from the primary image to the image sequence. For instance, control logic 206 may change the representation based on receipt of the gesture indicator 266.

As shown in FIG. 700, the method of flowchart 700 begins at step 702. In step 702, primary images are received. Each primary image has metadata that includes a reference to a respective image sequence that is based on a respective plurality of images that includes the primary image. In an example implementation, display logic 218 receives primary image(s) 240.

At step 704, a user interface that includes virtual elements is provided. Each virtual element corresponds to a respective primary image. Each virtual element further corresponds to a respective image sequence of the plurality of image sequences that is referenced in the metadata of the respective primary image. In an example implementation, interface logic 214 provides user interface 232.

At step 706, for each virtual element, the primary image that corresponds to the virtual element is displayed in the virtual element. In an example implementation, for each virtual element, display logic 218 displays the primary image that corresponds to the virtual element in the virtual element.

At step 708, a gesture is detected with regard to a designated virtual element. In an example implementation, gesture logic 220 detects gesture 248.

At step 710, the image sequence that corresponds to the designated virtual element, instead of the primary image that corresponds to the designated virtual element, is displayed in the designated virtual element, in response to detecting the gesture with regard to the designated virtual element. In an example implementation, display logic 218 displays the image sequence that corresponds to the designated virtual element in the designated virtual element.

In some example embodiments, one or more steps 702, 704, 706, 708, and/or 710 of flowchart 700 may not be performed. Moreover, steps in addition to or in lieu of steps 702, 704, 706, 708, and/or 710 may be performed. For instance, in an example embodiment, the method of flowchart 700 includes determining a frame in the image sequence that corresponds to the designated virtual element that depicts initiation of an action. For example, action logic 222 determines the frame in the image sequence that corresponds to the designated virtual element that depicts initiation of the action. Action logic 222 may generate a frame indicator 268 to specify the frame. In accordance with this embodiment, step 710 includes starting the displaying of the image sequence that corresponds to the designated virtual element at the frame. For example, display logic 218 may start the displaying at the frame. In accordance with this example, display logic 218 may start the displaying at the frame based on receipt of the frame indicator 268.

Figure 8:
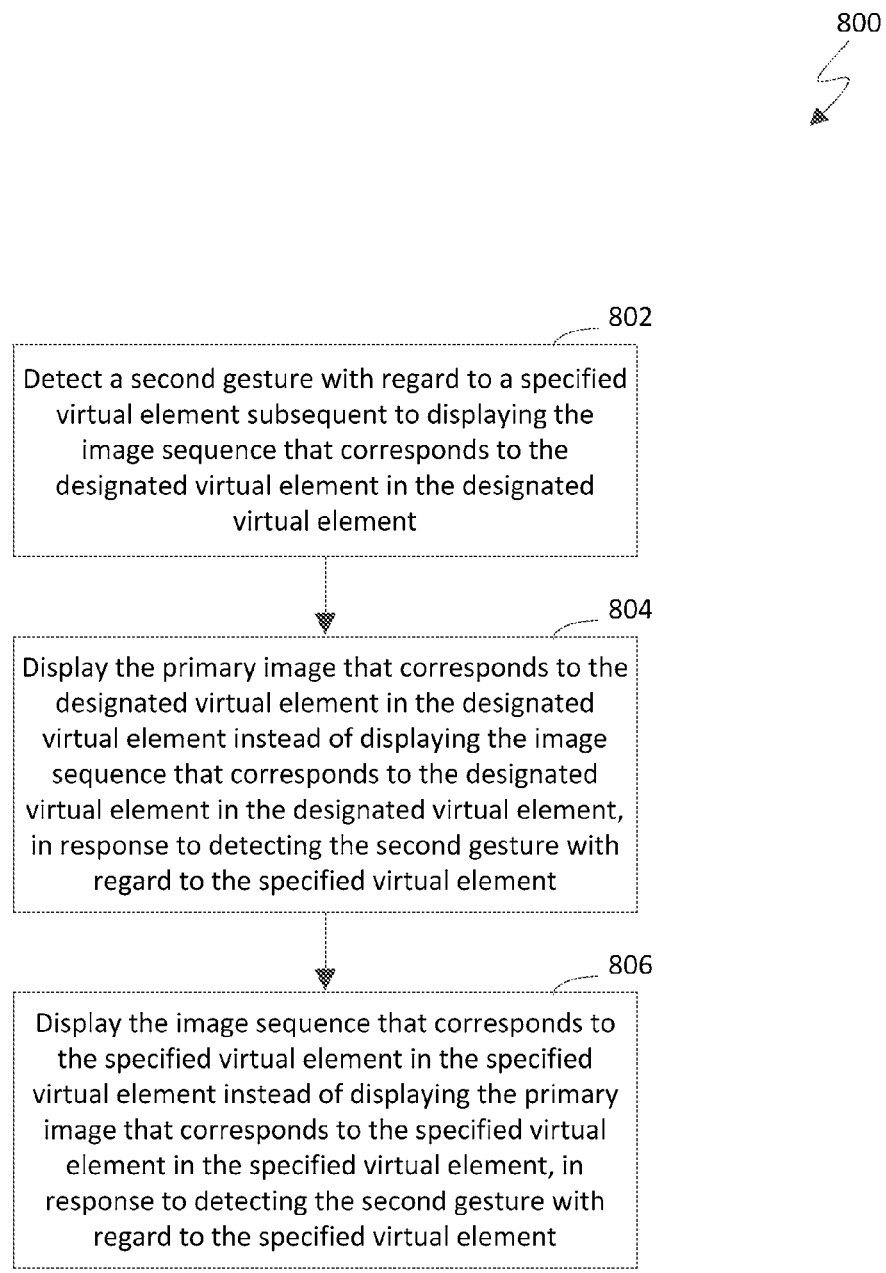

In another example embodiment, the method of flowchart 700 may include one or more of the steps shown in flowchart 800 of FIG. 8. As shown in FIG. 8, the method of flowchart 800 begins at step 802. In step 802, a second gesture is detected with regard to a specified virtual element subsequent to displaying the image sequence that corresponds to the designated virtual element in the designated virtual element. In an example implementation, gesture logic 220 detects the second gesture.

At step 804, the primary image that corresponds to the designated virtual element, instead of the image sequence that corresponds to the designated virtual element, is displayed in the designated virtual element in response to detecting the second gesture with regard to the specified virtual element. In an example implementation, display logic 218 displays the primary image that corresponds to the designated virtual element in the designated virtual element.

At step 806, the image sequence that corresponds to the specified virtual element, instead of the primary image that corresponds to the specified virtual element, is displayed in the specified virtual element in response to detecting the second gesture with regard to the specified virtual element. In an example implementation, display logic 218 displays the image sequence that corresponds to the specified virtual element in the specified virtual element.

Figure 9:
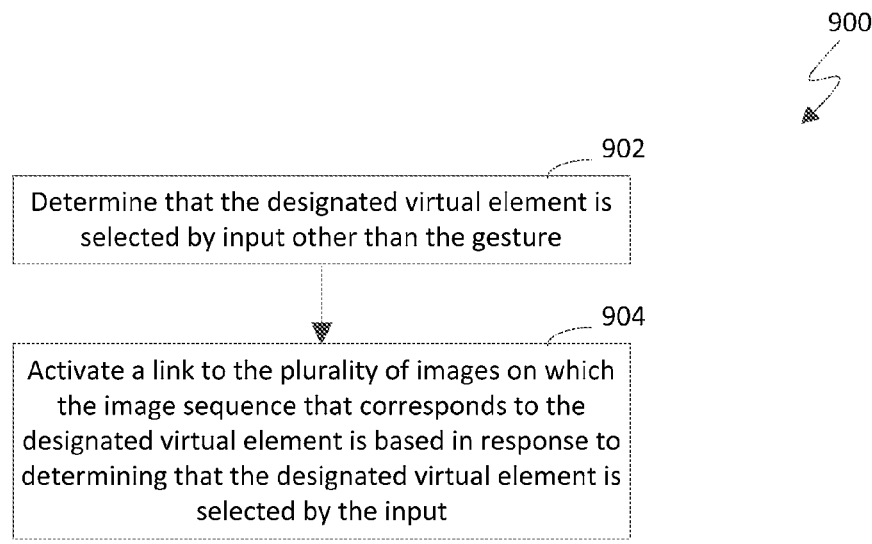

In yet another example embodiment, the method of flowchart 700 may include one or more of the steps shown in flowchart 900 of FIG. 9. As shown in FIG. 9, the method of flowchart 900 begins at step 902. In step 902, a determination is made that the designated virtual element is selected by input other than the gesture. In an example implementation, input determination logic 224 determines that the designated virtual element is selected by input 250. Input determination logic 224 may generate an activation instruction 252 in response to determining that the designated virtual element is selected by input 250. The activation instruction 252 instructs activation logic 226 to activate a link to the plurality of images on which the image sequence that corresponds to the designated virtual element is based.

At step 904, a link to the plurality of images on which the image sequence that corresponds to the designated virtual element is based is activated in response to determining that the designated virtual element is selected by the input. In an example implementation, activation logic 226 activates the link. For instance, activation logic 226 may activate the link based on receipt of the activation instruction 252. Activation logic 226 may generate an activation notifier 254 that specifies that the link is activated, in response to activating the link.

In an aspect of this embodiment, the method of flowchart 700 may include providing an indicator that specifies a time instance at which the image sequence that corresponds to the designated virtual element is to be deleted, in response to activating the link to the plurality of images on which the image sequence that corresponds to the designated virtual element is based. In an example implementation, indication logic 228 provide time indicator 272, which specifies the time instance at which the image sequence that corresponds to the designated virtual element is to be deleted. For instance, indication logic 228 may provide the time indicator 272 based on receipt of the activation notifier 254.

In another aspect of this embodiment, the method of flowchart 700 may include providing a user interface that enables selection of one or more contexts from a plurality of contexts of a device in which the image sequence that corresponds to the designated virtual element is to be displayed. For instance, the plurality of contexts may include a lock screen context, a start menu context, a call screen context, a contact context, a photo hub context, a photo gallery viewer context, a single photo viewer context, a pinned photo album context, a camera roll context, an online album context, a favorite photos context, etc. In an example implementation, interface logic 214 may provide user interface 232 to enable selection of the one or more contexts.

Figure 10:
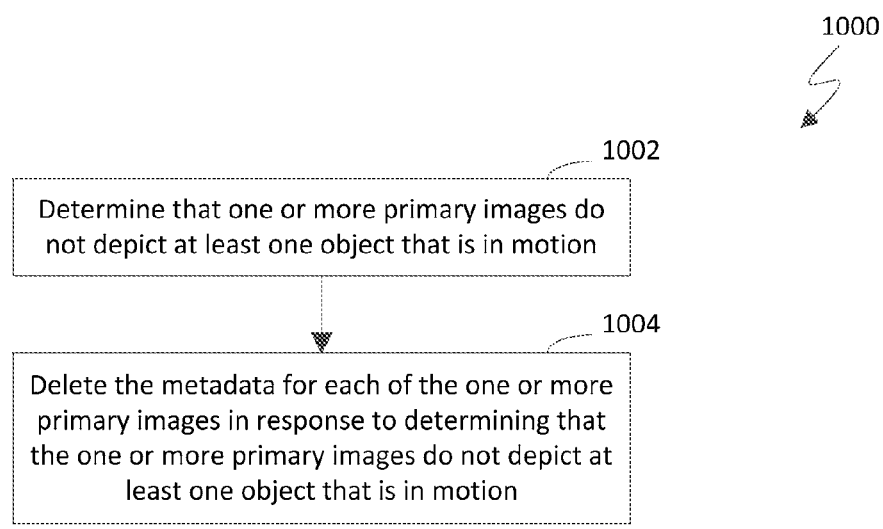

In still another example embodiment, the method of flowchart 700 may include one or more of the steps shown in flowchart 1000 of FIG. 10. As shown in FIG. 10, the method of flowchart 1000 begins at step 1002. In step 1002, a determination is made that one or more primary images do not depict at least one object that is in motion. In an example implementation, action logic 222 determines that one or more primary images do not depict at least one object that is in motion.

At step 1004, the metadata for each of the one or more primary images is deleted in response to determining that the one or more primary images do not depict at least one object that is in motion. In an example implementation, deletion logic 212 deletes the metadata for each of the one or more primary images. For instance, action logic 222 may generate deletion instruction 262 to instruct deletion logic 212 to delete the metadata for each of the one or more primary images. Deletion logic 212 may delete each of the one or more primary images based on receipt of the deletion instruction 262.

It will be recognized that device 200 may not include all of the components shown in FIG. 2. For instance, device 200 may not include one or more of camera 202, display 204, animation logic 270, user element 230, user interface 232, inquiry element 234, control logic 206, image sequence logic 208, metadata logic 210, deletion logic 212, interface logic 214, association logic 216, display logic 218, gesture logic 220, action logic 222, input determination logic 224, activation logic 226, and/or indication logic 228. Furthermore, device 200 may include components in addition to or in lieu of camera 202, display 204, animation logic 270, user element 230, user interface 232, inquiry element 234, control logic 206, image sequence logic 208, metadata logic 210, deletion logic 212, interface logic 214, association logic 216, display logic 218, gesture logic 220, action logic 222, input determination logic 224, activation logic 226, and/or indication logic 228.

Figure 11:
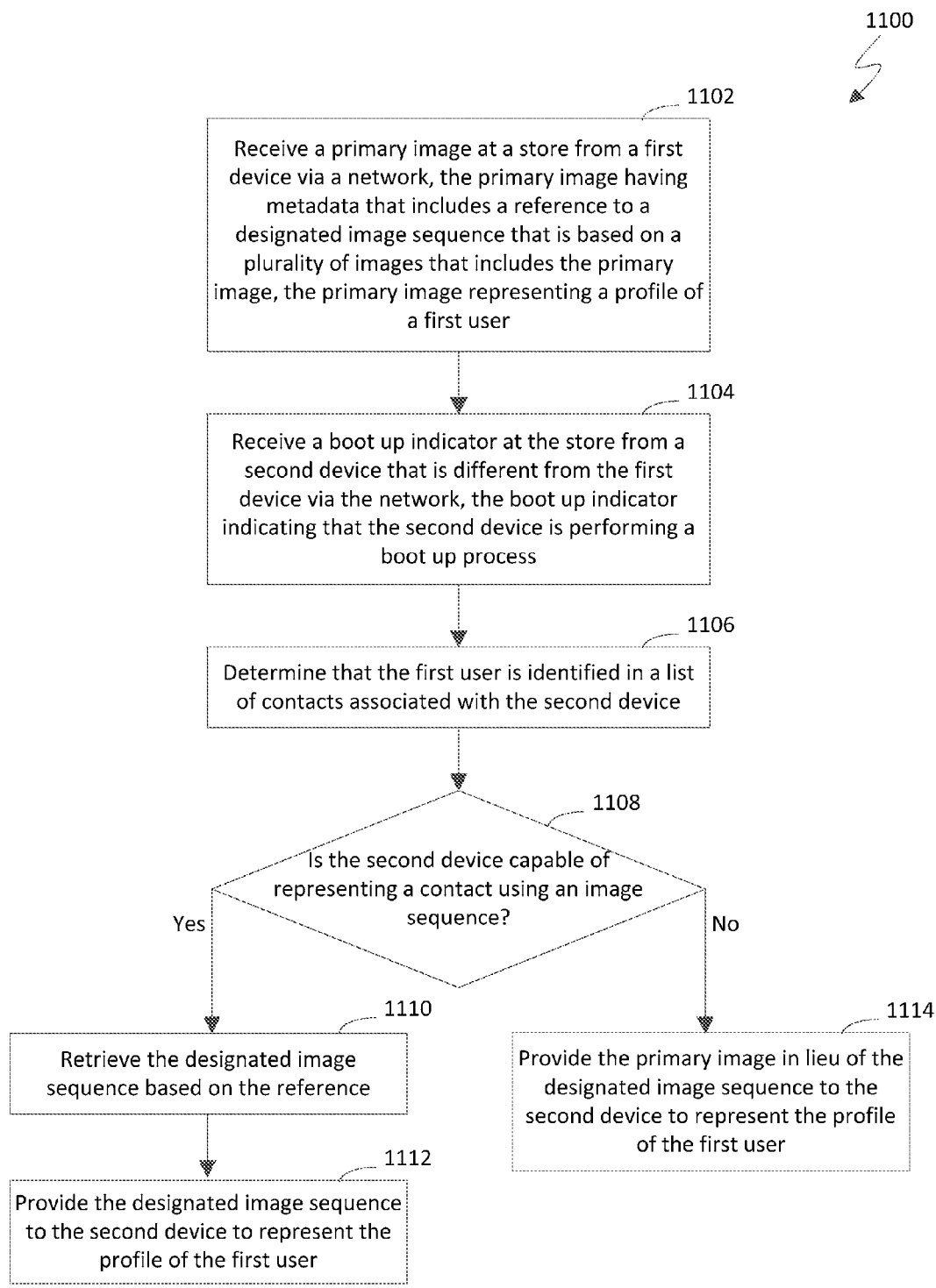
FIGS. 11-13 depict flowcharts of example methods for providing metadata-based photo and/or video animation from a perspective of server(s) shown in FIG. 1 in accordance with embodiments.
Figure 12:
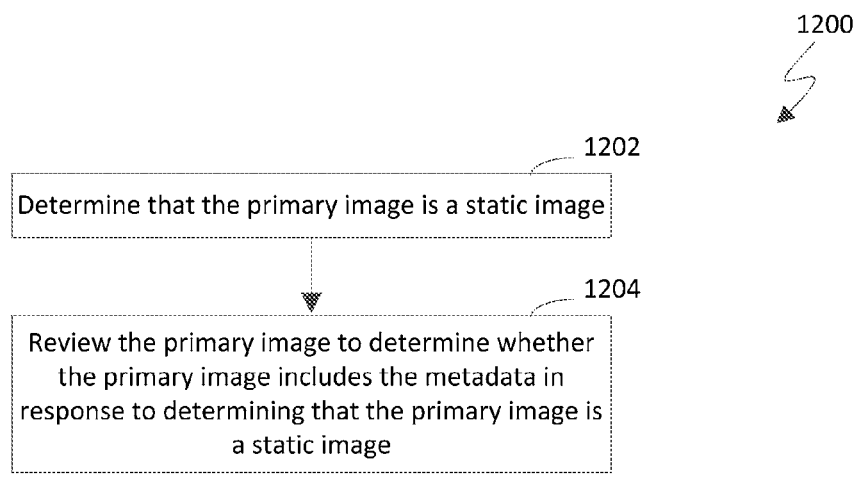
Figure 13:
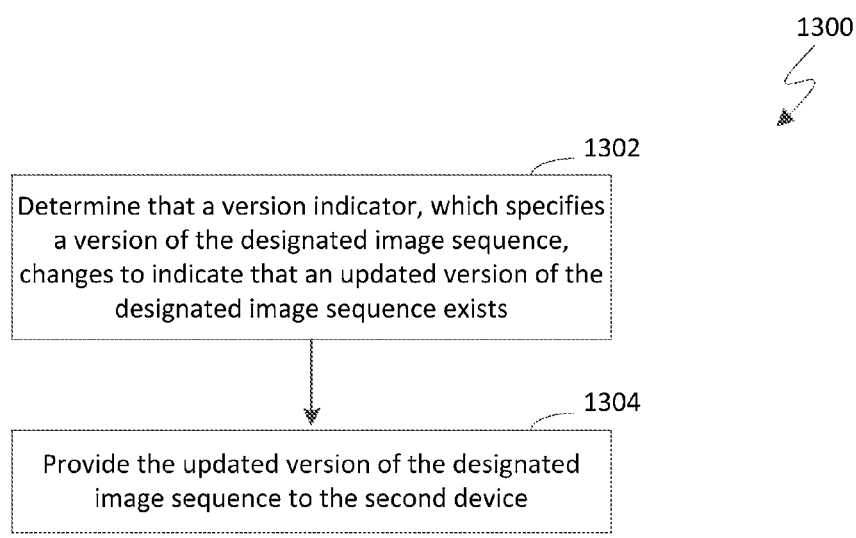
Figure 14:
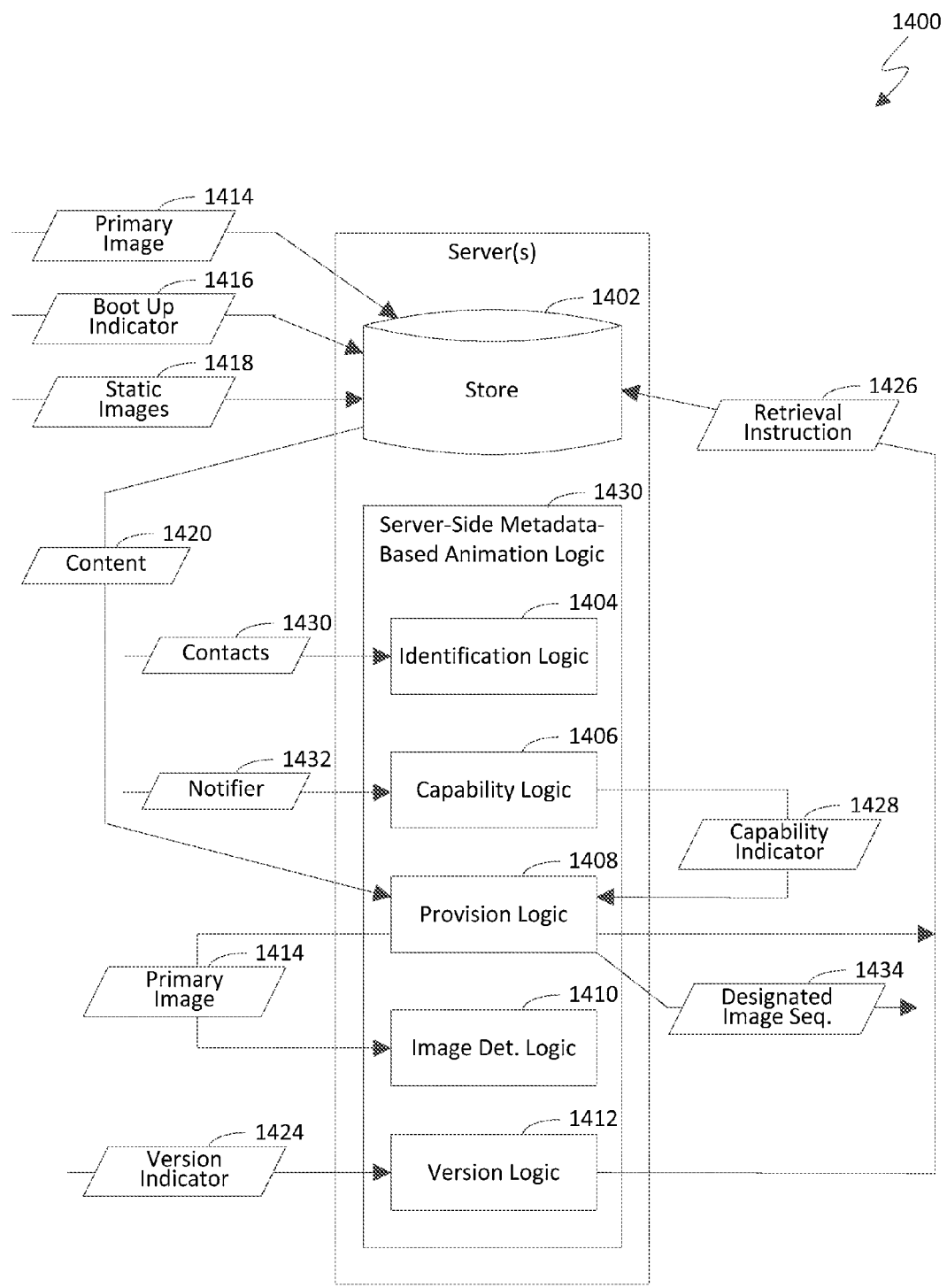
FIG. 14 is a block diagram of an example implementation of server(s) shown in FIG. 1 in accordance with an embodiment.

FIGS. 11-13 depict flowcharts 1100, 1200, and 1300 of example methods for providing metadata-based photo and/or video animation in accordance with embodiments. For illustrative purposes, flowcharts 1100, 1200, and 1300 are described with respect to server(s) 1400 shown in FIG. 14, which is an example of server(s) 102 of FIG. 1, according to an embodiment. As shown in FIG. 14, server(s) 1400 include a store 1402 and server-side metadata-based animation logic 1430 (hereinafter "animation logic 1430"). Animation logic 1430 include identification logic 1404, capability logic 1406, provision logic 1408, image determination logic 1410, and version logic 1412. Further structural and operational embodiments will be apparent to persons skilled in the relevant art(s) based on the discussion regarding flowcharts 1100, 1200, and 1300.

As shown in FIG. 1100, the method of flowchart 1100 begins at step 1102. In step 1102, a primary image is received at a store from a first device via a network. The primary image has metadata that includes a reference to (e.g., a reference that indicates a location of) a designated image sequence that is based on a plurality of images that includes the primary image. The primary image represents a profile of a first user. In an example implementation, store 1402 receives primary image 1414 from the first device. The designated image sequence may be generated in any of a variety of ways. For example, the plurality of images may be captured at the first device, and the designated image sequence may be generated at the first device or at sever(s) 1400. In another example, the designated image sequence may be generated at server(s) 1400 in accordance with an instruction from the first user. In yet another example, the designated image sequence may be generated by a third-party application. In accordance with this example, the third-party application may provide the designated image sequence to server(s) 1400.

At step 1104, a boot up indicator is received at the store from a second device that is different from the first device via the network. The boot up indicator indicates that the second device is performing a boot up process. In an example implementation, store 1402 receives boot up indicator 1416 from the second device.

At step 1106, a determination is made that the first user is identified in a list of contacts associated with the second device. In an example implementation, identification logic 1404 determines that the first user is identified in contacts 1430, which are associated with the second device.

At step 1108, a determination is made whether the second device is capable of representing a contact using an image sequence. If the second device is capable of representing a contact using an image sequence, flow continues to step 1110. Otherwise, flow continues to step 1114. In an example implementation, capability logic 1406 determines whether the second device is capable of representing a contact using an image sequence. For example, capability logic 1406 may receive a notifier 1432, which may indicate whether the second device is capable of representing a contact using an image sequence. In accordance with this example, capability logic 1406 may receive the notifier 1432 from the second device. Capability logic 1406 may determine whether the second device is capable of representing a contact using an image sequence based on receipt of the notifier 1432. Capability logic 1406 may provide a capability indicator 1428 to specify whether the second device is capable of representing a contact using an image sequence.

At step 1110, the designated image sequence is retrieved based on the reference. In an example implementation, provision logic 1408 retrieves designated image sequence 1434. For instance, provision logic 1408 may provide a retrieval instruction 1426 to store 1402, instructing store 1402 to provide the designated image sequence 1434. Provision logic 1408 may receive the designated image sequence 1434 in response to providing the retrieval instruction 1426. For example, the designated image sequence 1434 may be included in content 1420.

At step 1112, the designated image sequence is provided to the second device to represent the profile of the first user. In an example implementation, provision logic 1408 provides the designated image sequence 1434 to the second device.

At step 1114, the primary image is provided in lieu of the designated image sequence to the second device to represent the profile of the first user. In an example implementation, provision logic 1408 provides the primary image 1414 in lieu of the designated image sequence 1434 to the second device.

In an example embodiment, the second device is capable of representing a contact using an image sequence. In accordance with this embodiment, a static image or another image sequence that is stored locally with respect to the second device and that is not synched with the store is used in lieu of the designated image sequence at the second device to represent the profile of the first user.

It will be recognized that steps 1104, 1106, 1108, 1110, 1112, and/or 1114 may be performed for each of a plurality of devices in response to the devices performing a boot up process, though the scope of the example embodiments is not limited in this respect.

It will also be recognized that any one or more of steps 1102, 1104, 1106, 1108, and/or 1110 may be performed by the second device (e.g., any of devices 106A-106N) or client-side metadata-based animation logic thereon (e.g., rather than by server(s), such as server(s) 102, or server-side metadata-based animation logic thereon). For instance, a store on the second device may receive the primary image sequence at step 1102. Client-side metadata-based animation logic on the second device may determine that the first user is identified in the list of contacts at step 1106, determine whether the second device is capable of representing the contact using an image sequence at step 1108, and/or retrieve the designated image sequence at step 1110 (e.g., based on a determination that the second device is capable of representing the contact using an image sequence). The second device may cache the image sequence for later use, though the scope of the example embodiments is not limited in this respect. The second device may receive the primary image at step 1114, rather than providing the primary image.

The second device may store the list of contacts. Accordingly the servers(s) need not necessarily know about the contacts. The device can retrieve the image sequence at step 1110 from a third party service (e.g., a legacy service), such as Google® or Facebook®.

In some example embodiments, one or more steps 1102, 1104, 1106, 1108, 1110, 1112, and/or 1114 of flowchart 1100 may not be performed. Moreover, steps in addition to or in lieu of steps 1102, 1104, 1106, 1108, 1110, 1112, and/or 1114 may be performed. For instance, in an example embodiment, the method of flowchart 1100 includes storing static images that represent respective profiles of the first user. The profiles corresponds to respective services. Examples of a service include but are not limited to Microsoft Exchange Server®, Facebook®, etc. In an example implementation, store 1402 stores static images 1418. It will be recognized that static images 1418 may include the primary image 1414.

In accordance with this embodiment, step 1112 includes overriding the static images with the designated image sequence by providing the designated image sequence to the second device to be used with respect to the profiles. For instance, provision logic 1408 may override the static images 1418 with the designated image sequence 1434 (e.g., in accordance with a default setting of server(s) 1400).

In another example embodiment, the method of flowchart 1100 may include one or more of the steps shown in flowchart 1200 of FIG. 12. As shown in FIG. 12, the method of flowchart 1200 begins at step 1202. In step 1202, a determination is made that the primary image is a static image. For instance, image determination logic 1410 may determine that the primary image 1414 is a static image.

At step 1204, the primary image is reviewed to determine whether the primary image includes the metadata in response to determining that the primary image is a static image. For instance, image determination logic 1410 may review the primary image 1414 to determine whether the primary image 1414 includes the metadata.

It will be recognized that steps 1202 and/or 1204 may be performed by the second device or client-side metadata-based animation logic thereon (e.g., rather than by server(s), such as server(s) 102, or server-side metadata-based animation logic thereon). For instance, the client-side metadata-based animation logic on the second device may determine that the primary image is a static image at step 1202. The client-side metadata-based animation logic on the second device may review the primary image at step 1204.

In another example embodiment, the method of flowchart 1100 may include one or more of the steps shown in flowchart 1300 of FIG. 13. As shown in FIG. 13, the method of flowchart 1300 begins at step 1302. In step 1302, a determination is made that a version indicator, which specifies a version of the designated image sequence, changes to indicate that an updated version of the designated image sequence exists. For example, a version indicator 1424 may specify a version of the designated image sequence 1434. In accordance with this example, version logic 1412 may determine that the version indicator 1424 changes to indicate that an updated version of the designated image sequence 1434 exists.

At step 1304, the updated version of the designated image sequence is provided to the second device. For example, provision logic 1408 may provide the updated version of the designated image sequence 1434 to the second device. In accordance with this example, version logic 1412 may provide a retrieval instruction 1426 to store 1402, instructing store 1402 to provide the updated version of the designated image sequence 1434. For instance, version logic 1412 may provide the retrieval instruction 1426 based on receipt of the version indicator 1424. Provision logic 1408 may receive the updated version of the designated image sequence 1434 from store 1402 in response to providing the retrieval instruction 1426. The updated version of the designated image sequence may be included in content 1420, for example. Provision logic 1408 may provide the updated version of the designated image sequence upon receipt from store 1402.

It will be recognized that step 1302 may be performed by the second device or client-side metadata-based animation logic thereon (e.g., rather than by server(s), such as server(s) 102, or server-side metadata-based animation logic thereon). For instance, the client-side metadata-based animation logic on the second device may determine that the version indicator changes at step 1302. The client-side metadata-based animation logic on the second device may receive (e.g., retrieve) the updated version of the designated image sequence at step 1304, rather than providing the updated version.

It will be recognized that server(s) 1400 may not include all of the components shown in FIG. 14. For instance, server(s) 1400 may not include one or more of store 1402, animation logic 1430, identification logic 1404, capability logic 1406, provision logic 1408, image determination logic 1410, and/or version logic 1412. Furthermore, server(s) 1400 may include components in addition to or in lieu of store 1402, animation logic 1430, identification logic 1404, capability logic 1406, provision logic 1408, image determination logic 1410, and/or version logic 1412.

Figure 15:
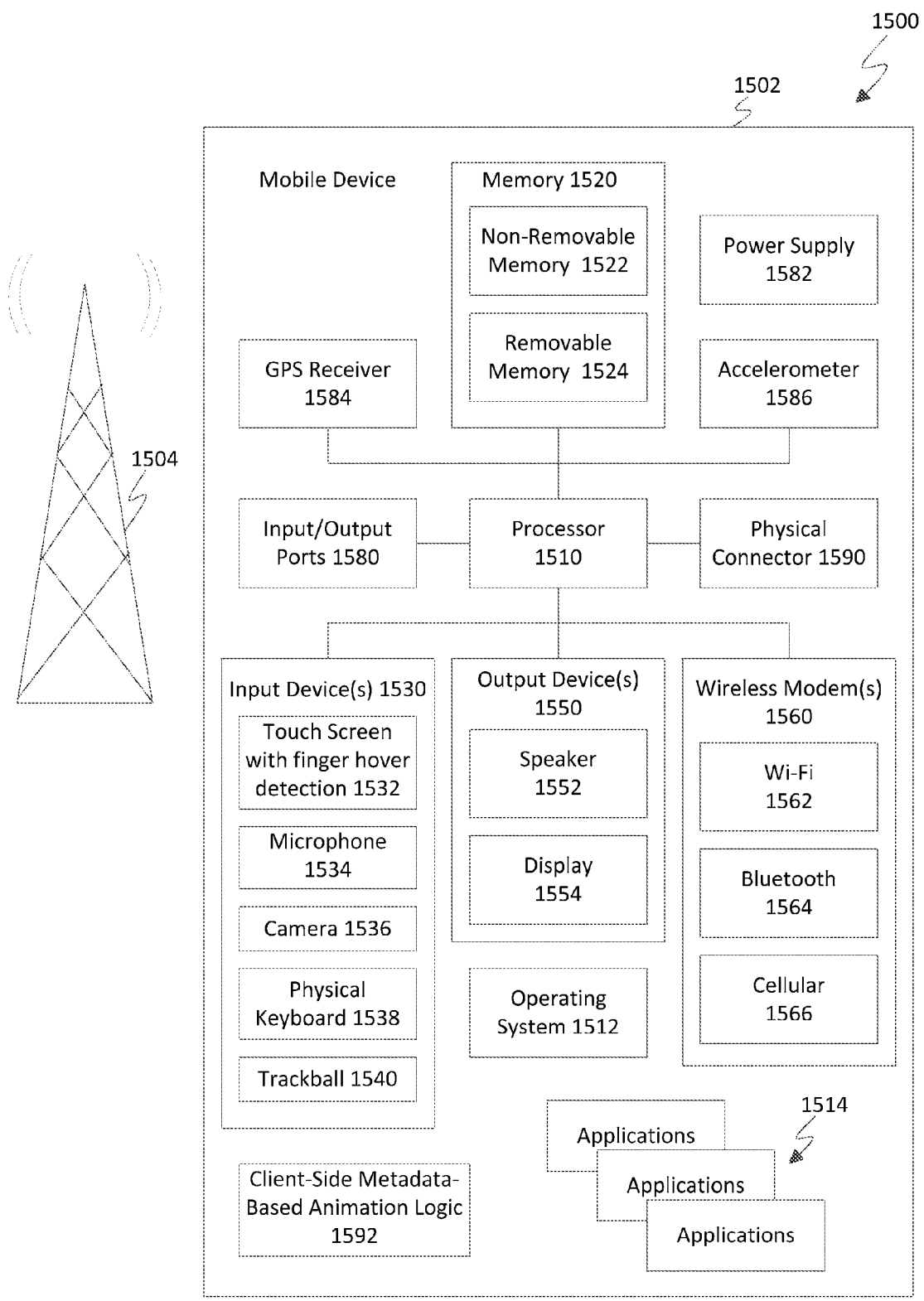
FIG. 15 is a system diagram of an exemplary mobile device with a touch screen for sensing touch and hover commands in accordance with an embodiment

FIG. 15 is a system diagram depicting an exemplary mobile device 1500 including a variety of optional hardware and software components, shown generally as 1502. Any components 1502 in the mobile device can communicate with any other component, though not all connections are shown, for ease of illustration. The mobile device 1500 can be any of a variety of computing devices (e.g., cell phone, smartphone, handheld computer, Personal Digital Assistant (PDA), etc.) and can allow wireless two-way communications with one or more mobile communications networks 1504, such as a cellular or satellite network, or with a local area or wide area network.

The illustrated mobile device 1500 can include a controller or processor 1510 (e.g., signal processor, microprocessor, ASIC, or other control and processing logic circuitry) for performing such tasks as signal coding, data processing, input/output processing, power control, and/or other functions. An operating system 1512 can control the allocation and usage of the components 1502 and support for one or more application programs 1514 (a.k.a. applications). The application programs 1514 can include common mobile computing applications (e.g., email applications, calendars, contact managers, web browsers, messaging applications) and any other computing applications (e.g., word processing applications, mapping applications, media player applications).

The illustrated mobile device 1500 can include memory 1520. Memory 1520 can include non-removable memory 1522 and/or removable memory 1524. The non-removable memory 1522 can include RAM, ROM, flash memory, a hard disk, or other well-known memory storage technologies. The removable memory 1524 can include flash memory or a Subscriber Identity Module (SIM) card, which is well known in GSM communication systems, or other well-known memory storage technologies, such as "smart cards." The memory 1520 can be used for storing data and/or code for running the operating system 1512 and the applications 1514. Example data can include web pages, text, images, sound files, video data, or other data sets to be sent to and/or received from one or more network servers or other devices via one or more wired or wireless networks. The memory 1520 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1500 can support one or more input devices 1530, such as a touch screen 1532, microphone 1534, camera 1536, physical keyboard 1538 and/or trackball 1540 and one or more output devices 1550, such as a speaker 1552 and a display 1554. Touch screens, such as touch screen 1532, can detect input in different ways. For example, capacitive touch screens detect touch input when an object (e.g., a fingertip) distorts or interrupts an electrical current running across the surface. As another example, touch screens can use optical sensors to detect touch input when beams from the optical sensors are interrupted. Physical contact with the surface of the screen is not necessary for input to be detected by some touch screens. For example, the touch screen 1532 can support a finger hover detection using capacitive sensing, as is well understood in the art. Other detection techniques can be used, including camera-based detection and ultrasonic-based detection. To implement a finger hover, a user's finger is typically within a predetermined spaced distance above the touch screen, such as between 0.1 to 0.25 inches, or between 0.0.25 inches and 0.05 inches, or between 0.0.5 inches and 0.75 inches or between 0.75 inches and 1 inch, or between 1 inch and 1.5 inches, etc.

The mobile device 1500 can include client-side metadata-based animation logic 1592 (hereinafter "animation logic 1592"). The animation logic 1592 is configured to provide photo and/or video animation on the mobile device 1500 in accordance with any one or more of the techniques described herein.

Other possible output devices (not shown) can include piezoelectric or other haptic output devices. Some devices can serve more than one input/output function. For example, touch screen 1532 and display 1554 can be combined in a single input/output device. The input devices 1530 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1512 or applications 1514 can comprise speech-recognition software as part of a voice control interface that allows a user to operate the device 1500 via voice commands. Further, the device 1500 can comprise input devices and software that allows for user interaction via a user's spatial gestures, such as detecting and interpreting gestures to provide input to a gaming application.

Wireless modem(s) 1560 can be coupled to antenna(s) (not shown) and can support two-way communications between the processor 1510 and external devices, as is well understood in the art. The modem(s) 1560 are shown generically and can include a cellular modem 1566 for communicating with the mobile communication network 1504 and/or other radio-based modems (e.g., Bluetooth 1564 and/or Wi-Fi 1562). At least one of the wireless modem(s) 1560 is typically configured for communication with one or more cellular networks, such as a GSM network for data and voice communications within a single cellular network, between cellular networks, or between the mobile device and a public switched telephone network (PSTN).

The mobile device can further include at least one input/output port 1580, a power supply 1582, a satellite navigation system receiver 1584, such as a Global Positioning System (GPS) receiver, an accelerometer 1586, and/or a physical connector 1590, which can be a USB port, IEEE 1394 (FireWire) port, and/or RS-232 port. The illustrated components 1502 are not required or all-inclusive, as any components can be deleted and other components can be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any one or more of animation logic 112A-112N, animation logic 110, animation logic 270, control logic 206, image sequence logic 208, metadata logic 210, deletion logic 212, interface logic 214, association logic 216, display logic 218, gesture logic 220, action logic 222, input determination logic 224, activation logic 226, indication logic 228, animation logic 1430, identification logic 1404, capability logic 1406, provision logic 1408, image determination logic 1410, and/or version logic 1412, flowchart 300, flowchart 400, flowchart 500, flowchart 600, flowchart 700, flowchart 800, flowchart 900, flowchart 1000, flowchart 1100, flowchart 1200, and/or flowchart 1300 may be implemented in hardware, software, firmware, or any combination thereof.

For example, any one or more of animation logic 112A-112N, animation logic 110, animation logic 270, control logic 206, image sequence logic 208, metadata logic 210, deletion logic 212, interface logic 214, association logic 216, display logic 218, gesture logic 220, action logic 222, input determination logic 224, activation logic 226, indication logic 228, animation logic 1430, identification logic 1404, capability logic 1406, provision logic 1408, image determination logic 1410, and/or version logic 1412, flowchart 300, flowchart 400, flowchart 500, flowchart 600, flowchart 700, flowchart 800, flowchart 900, flowchart 1000, flowchart 1100, flowchart 1200, and/or flowchart 1300 may be implemented as computer program code configured to be executed in one or more processors.

In another example, any one or more of animation logic 112A-112N, animation logic 110, animation logic 270, control logic 206, image sequence logic 208, metadata logic 210, deletion logic 212, interface logic 214, association logic 216, display logic 218, gesture logic 220, action logic 222, input determination logic 224, activation logic 226, indication logic 228, animation logic 1430, identification logic 1404, capability logic 1406, provision logic 1408, image determination logic 1410, and/or version logic 1412, flowchart 300, flowchart 400, flowchart 500, flowchart 600, flowchart 700, flowchart 800, flowchart 900, flowchart 1000, flowchart 1100, flowchart 1200, and/or flowchart 1300 may be implemented as hardware logic/electrical circuitry.

For instance, in an embodiment, one or more of animation logic 112A-112N, animation logic 110, animation logic 270, control logic 206, image sequence logic 208, metadata logic 210, deletion logic 212, interface logic 214, association logic 216, display logic 218, gesture logic 220, action logic 222, input determination logic 224, activation logic 226, indication logic 228, animation logic 1430, identification logic 1404, capability logic 1406, provision logic 1408, image determination logic 1410, and/or version logic 1412, flowchart 300, flowchart 400, flowchart 500, flowchart 600, flowchart 700, flowchart 800, flowchart 900, flowchart 1000, flowchart 1100, flowchart 1200, and/or flowchart 1300 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Example Computer System

Figure 16:
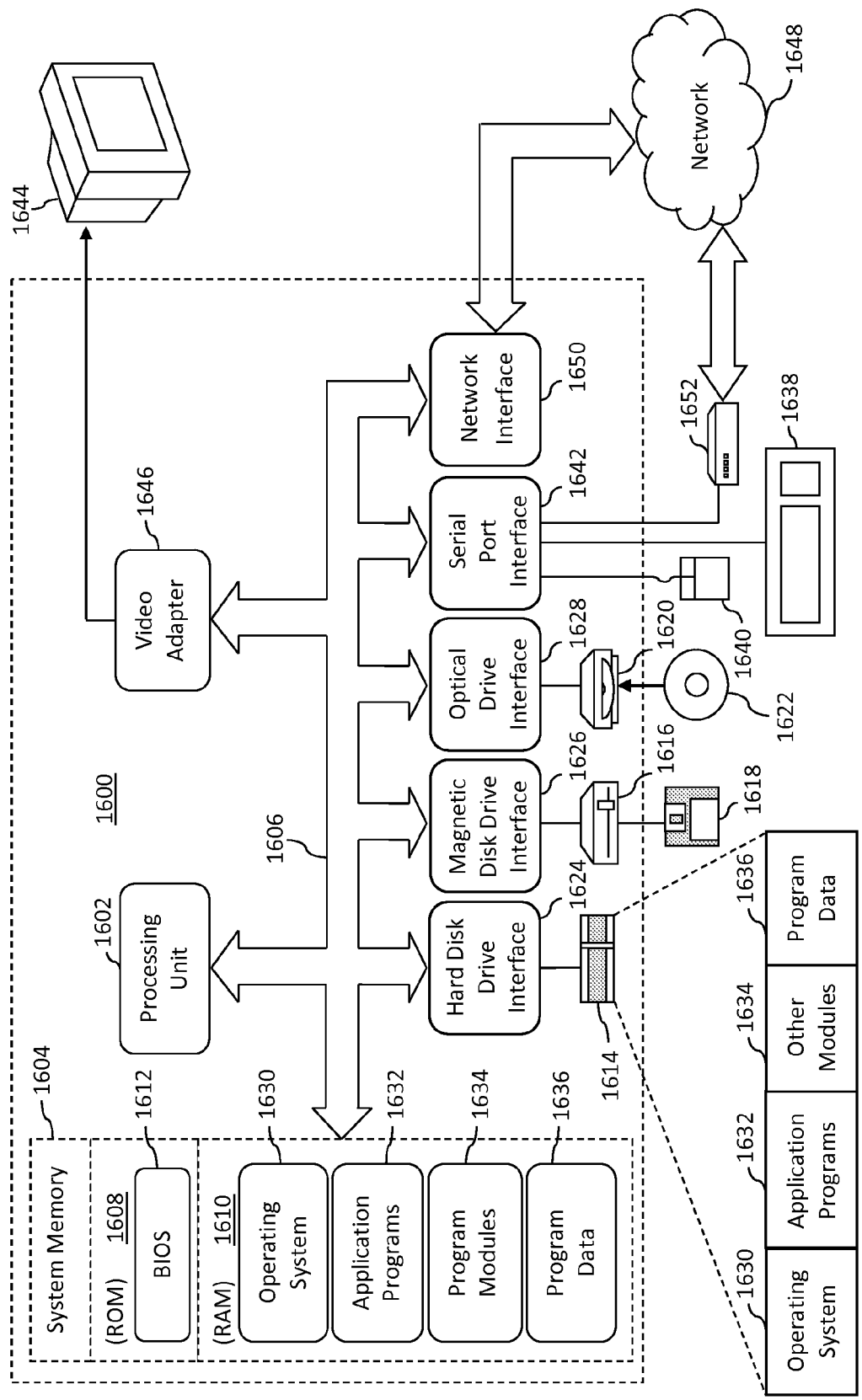
FIG. 16 depicts an example computer in which embodiments may be implemented.

FIG. 16 depicts an example computer 1600 in which embodiments may be implemented. For instance, any of devices 106A-106N and/or server(s) 102 shown in FIG. 1 may be implemented using computer 1600, including one or more features of computer 1600 and/or alternative features. Computer 1600 may be a general-purpose computing device in the form of a conventional personal computer, a mobile computer, or a workstation, for example, or computer 1600 may be a special purpose computing device. The description of computer 1600 provided herein is provided for purposes of illustration, and is not intended to be limiting. Embodiments may be implemented in further types of computer systems, as would be known to persons skilled in the relevant art(s).

As shown in FIG. 16, computer 1600 includes a processing unit 1602, a system memory 1604, and a bus 1606 that couples various system components including system memory 1604 to processing unit 1602. Bus 1606 represents one or more of any of several types of bus structures, including a memory bus or memory controller, a peripheral bus, an accelerated graphics port, and a processor or local bus using any of a variety of bus architectures. System memory 1604 includes read only memory (ROM) 1608 and random access memory (RAM) 1610. A basic input/output system 1612 (BIOS) is stored in ROM 1608.

Computer 1600 also has one or more of the following drives: a hard disk drive 1614 for reading from and writing to a hard disk, a magnetic disk drive 1616 for reading from or writing to a removable magnetic disk 1618, and an optical disk drive 1620 for reading from or writing to a removable optical disk 1622 such as a CD ROM, DVD ROM, or other optical media. Hard disk drive 1614, magnetic disk drive 1616, and optical disk drive 1620 are connected to bus 1606 by a hard disk drive interface 1624, a magnetic disk drive interface 1626, and an optical drive interface 1628, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1630, one or more application programs 1632, other program modules 1634, and program data 1636. Application programs 1632 or program modules 1634 may include, for example, computer program logic for implementing any one or more of animation logic 112A-112N, animation logic 110, animation logic 270, control logic 206, image sequence logic 208, metadata logic 210, deletion logic 212, interface logic 214, association logic 216, display logic 218, gesture logic 220, action logic 222, input determination logic 224, activation logic 226, indication logic 228, animation logic 1430, identification logic 1404, capability logic 1406, provision logic 1408, image determination logic 1410, and/or version logic 1412, flowchart 300 (including any step of flowchart 300), flowchart 400 (including any step of flowchart 400), flowchart 500 (including any step of flowchart 500), flowchart 600 (including any step of flowchart 600), flowchart 700 (including any step of flowchart 700), flowchart 800 (including any step of flowchart 800), flowchart 900 (including any step of flowchart 900), flowchart 1000 (including any step of flowchart 1000), flowchart 1100 (including any step of flowchart 1100), flowchart 1200 (including any step of flowchart 1200), and/or flowchart 1300 (including any step of flowchart 1300), as described herein.

A user may enter commands and information into the computer 1600 through input devices such as keyboard 1638 and pointing device 1640. Other input devices (not shown) may include a microphone, joystick, game pad, satellite dish, scanner, touch screen, camera, accelerometer, gyroscope, or the like. These and other input devices are often connected to the processing unit 1602 through a serial port interface 1642 that is coupled to bus 1606, but may be connected by other interfaces, such as a parallel port, game port, or a universal serial bus (USB).

A display device 1644 (e.g., a monitor) is also connected to bus 1606 via an interface, such as a video adapter 1646. In addition to display device 1644, computer 1600 may include other peripheral output devices (not shown) such as speakers and printers.

Computer 1600 is connected to a network 1648 (e.g., the Internet) through a network interface or adapter 1650, a modem 1652, or other means for establishing communications over the network. Modem 1652, which may be internal or external, is connected to bus 1606 via serial port interface 1642.

As used herein, the terms "computer program medium" and "computer-readable storage medium" are used to generally refer to media such as the hard disk associated with hard disk drive 1614, removable magnetic disk 1618, removable optical disk 1622, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1632 and other program modules 1634) may be stored on the hard disk, magnetic disk, optical disk, ROM, or RAM. Such computer programs may also be received via network interface 1650 or serial port interface 1642. Such computer programs, when executed or loaded by an application, enable computer 1600 to implement features of embodiments discussed herein. Accordingly, such computer programs represent controllers of the computer 1600.

Example embodiments are also directed to computer program products comprising software (e.g., computer-readable instructions) stored on any computer-useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technology is not limited to any particular computer or type of hardware. Certain details of suitable computers and hardware are well known and need not be set forth in detail in this disclosure.

IV. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:

1. A device comprising:
   a camera that includes a user element which, when selected, initiates capture of one or more images;
   one or more processors;
   control logic, implemented using at least one of the one or more processors, configured to control the camera to capture a plurality of images in response to each selection of the user element;
   image sequence logic, implemented using at least one of the one or more processors, configured to generate an image sequence from each plurality of images; and
   metadata logic, implemented using at least one of the one or more processors, configured to, for each plurality of images, associate metadata with a primary image selected from the plurality of images, the metadata including a reference to the image sequence that is generated from the plurality of images,
      the control logic further configured to, for each plurality of images, display a static image associated with the plurality of images or the image sequence that is generated from the plurality of images in a virtual element on a display based at least in part on whether the device has a designated functionality,
      the control logic configured to display the image sequence in the virtual element by using the reference in the metadata that is associated with the primary image to access the image sequence based at least in part on the device having the designated functionality,
      the control logic configured to display the static image in the virtual element based at least in part on the device not having the designated functionality.

2. The device of claim 1, further comprising:
   deletion logic, implemented using at least one of the one or more processors, configured to delete each metadata in response to passage of a specified duration of time in accordance with a default setting of the device.

3. The device of claim 2, wherein the deletion logic is configured to override the default setting by not deleting designated metadata based at least in part on the image sequence that is referenced by the designated metadata being selected to be displayed in lieu of the corresponding static image.

4. The device of claim 2, further comprising:
   interface logic, implemented using at least one of the one or more processors, configured to provide a user interface that includes an inquiry element that solicits a response from a user of the device regarding the specified duration of time in response to passage of which each metadata is to be deleted in accordance with the default setting of the device, the interface logic further configured to define the specified duration of time based on the response.

5. The device of claim 1, further comprising:
   interface logic, implemented using at least one of the one or more processors, configured to provide a user interface that enables a user of the device to select a designated profile to be represented by the image sequence; and
   association logic configured to use the image sequence to represent the designated profile in response to selection of the designated profile.

6. The device of claim 5, further comprising:
   display logic, implemented using at least one of the one or more processors, configured to display the image sequence in each of a plurality of contexts of the device in which a representation of the designated profile is to be displayed, in response to the image sequence being used to represent the designated profile.

7. The device of claim 1, wherein the image sequence logic is configured to convert each plurality of images into a respective image sequence having a designated bitmap image format.

8. The device of claim 1, wherein the image sequence logic is configured to create a control that generates the respective image sequence from each plurality of images.

9. The device of claim 1, further comprising:
   gesture logic, implemented using at least one of the one or more processors, configured to detect a gesture with respect to the device;
   wherein a representation, which is selected to be displayed, is set to be the primary image from a captured plurality of images; and
   wherein the control logic is further configured to change the representation from the primary image from the captured plurality of images to the image sequence that is generated from the captured plurality of images in response to detection of the gesture based at least in part on the primary image being selected from the plurality of images from which the image sequence is generated.

10. A method of providing at least one of metadata-based photo animation or metadata-based video animation using one or more processors of a processor-based system, the method comprising:

controlling a camera, which has a user element which, when selected, initiates capture of one or more images, to capture a plurality of images in response to each selection of the user element;

generating, using at least one of the one or more processors, an image sequence from each plurality of images;

for each plurality of images, associating metadata with a primary image selected from the plurality of images, the metadata including a reference to the image sequence that is generated from the plurality of images; and for each plurality of images, causing a static image associated with the plurality of images or the image sequence that is generated from the plurality of images to be displayed in a virtual element on a display based at least in part on whether the processor-based system has a designated functionality, the image sequence to be displayed in the virtual element by using the reference in the metadata that is associated with the primary image to access the image sequence based at least in part on the processor-based system having the designated functionality, the static image to be displayed in the virtual element based at least in part on the processor-based system not having the designated functionality.

11. The method of claim 10, further comprising:
deleting each metadata in response to passage of a specified duration of time in accordance with a default setting of a device that includes the camera unless at least one of one or more specified criteria is satisfied.

12. The method of claim 11, wherein the one or more specified criteria include a criterion that the image sequence that is referenced by the respective metadata is selected to be displayed in lieu of the corresponding static image.

13. The method of claim 11, further comprising:
providing a user interface that includes an inquiry element that solicits a response from a user of a device that includes the camera regarding the specified duration of time in response to passage of which each metadata is to be deleted in accordance with the default setting of the device that includes the camera; and defining the specified duration of time based on the response.

14. The method of claim 10, further comprising:
providing a user interface that enables a user of a device that includes the camera to select a designated profile to be represented by the image sequence; and using the image sequence to represent the designated profile in response to selection of the designated profile.

15. The method of claim 14, further comprising:
displaying the image sequence in each of a plurality of contexts in which a representation of the designated profile is to be displayed by a device that includes the camera, in response to using the image sequence to represent the designated profile.

16. The method of claim 10, wherein generating an image sequence from each plurality of images comprises:
converting each plurality of images into a respective image sequence having a designated bitmap image format.

17. The method of claim 10, wherein generating an image sequence from each plurality of images comprises:
creating a control that generates the respective image sequence from each plurality of images.

18. The method of claim 10, wherein a representation, which is selected to be displayed, is set to be the primary image from a captured plurality of images; and wherein the method further comprises:

detecting a gesture with respect to a device that includes the camera; and changing the representation from the primary image from the captured plurality of images to the image sequence that is generated from the captured plurality of images in response to detecting the gesture based at least in part on the primary image being selected from the plurality of images from which the image sequence is generated.

19. A computer program product comprising a computer-readable device having computer program logic recorded thereon for enabling a processor-based system to provide at least one of metadata-based photo animation or metadata-based video animation, the computer program logic comprising:

first program logic for enabling the processor-based system to control a camera, which has a user element which, when selected, initiates capture of one or more images, to capture a plurality of images in response to each selection of the user element;

second program logic for enabling the processor-based system to generate an image sequence from each plurality of images;

third program logic for enabling the processor-based system to, for each plurality of images, associate metadata with a primary image selected from the plurality of images, the metadata including a reference to the image sequence that is generated from the plurality of images; and fourth program logic for enabling the processor-based system to, for each plurality of images, display a static image associated with the plurality of images or the image sequence that is generated from the plurality of images in a virtual element on a display based at least in part on whether the device has a designated functionality, the image sequence to be displayed in the virtual element by using the reference in the metadata that is associated with the primary image to access the image sequence based at least in part on the device having the designated functionality, the static image to be displayed in the virtual element based at least in part on the device not having the designated functionality.

20. The computer program product of claim 19, wherein the computer program logic further comprises:

fifth program logic for enabling the processor-based system to delete each metadata in response to passage of a specified duration of time in accordance with a default setting of a device that includes the camera unless at least one of one or more specified criteria is satisfied.

* * * * *